(12) United States Patent
Coveley et al.

(10) Patent No.: US 9,070,068 B2
(45) Date of Patent: Jun. 30, 2015

(54) PASSIVE TAMPER-RESISTANT SEAL AND APPLICATIONS THEREFOR

(76) Inventors: Michael E. Coveley, Richmond Hill (CA); Srdjan Milutinovic, Brampton (CA); Yuping Huang, Richmond Hill (CA)

(*) Notice: Subject to any disclaimer, the term of this patent is extended or adjusted under 35 U.S.C. 154(b) by 0 days.

(21) Appl. No.: 13/302,958

(22) Filed: Nov. 22, 2011

(65) Prior Publication Data

US 2012/0235815 A1 Sep. 20, 2012

(51) Int. Cl.
*G08B 13/08* (2006.01)
*G06K 19/077* (2006.01)
*G08B 13/12* (2006.01)
*G08B 13/24* (2006.01)

(52) U.S. Cl.
CPC .... *G06K 19/07749* (2013.01); *G06K 19/07798* (2013.01); *G08B 13/126* (2013.01); *G08B 13/2417* (2013.01)

(58) Field of Classification Search
CPC .................. G06K 19/07749; G06K 19/07798
USPC ............ 340/545.6, 545.1, 541, 572.1–572.4, 340/687, 539.31, 303; 235/375, 382, 385, 235/492
See application file for complete search history.

(56) References Cited

U.S. PATENT DOCUMENTS

| | | | | |
|---|---|---|---|---|
| 6,050,622 | A * | 4/2000 | Gustafson ................. | 292/307 R |
| 6,747,558 | B1 * | 6/2004 | Thorne et al. ................. | 340/551 |
| 7,098,794 | B2 * | 8/2006 | Lindsay et al. ............ | 340/572.3 |
| 2002/0067264 | A1 * | 6/2002 | Soehnlen .................... | 340/572.1 |
| 2004/0100379 | A1 * | 5/2004 | Boman et al. ............. | 340/539.26 |
| 2005/0128087 | A1 * | 6/2005 | Claessens et al. ......... | 340/572.8 |
| 2005/0162277 | A1 * | 7/2005 | Teplitxky et al. .......... | 340/572.8 |

\* cited by examiner

*Primary Examiner* — Tai T Nguyen
(74) *Attorney, Agent, or Firm* — Sim & McBurney

(57) ABSTRACT

A radio frequency identification seal comprises an antenna including a main antenna portion and at least one break-away portion and an RFID tag coupled and tuned to the antenna. The RFID tag outputs a signature in response to a scanning signal when tuned to the antenna.

29 Claims, 39 Drawing Sheets

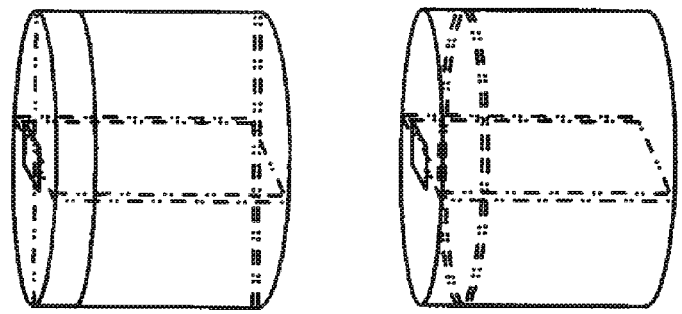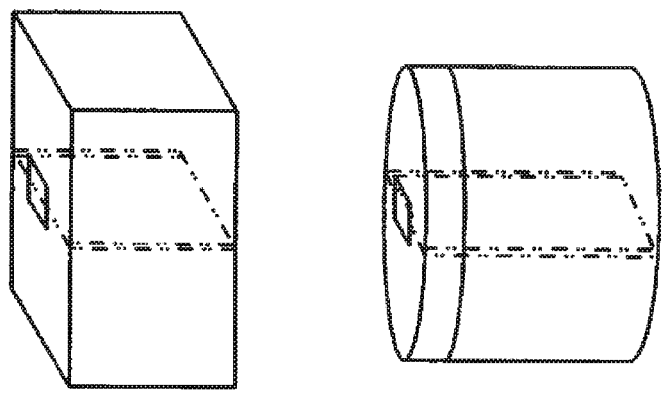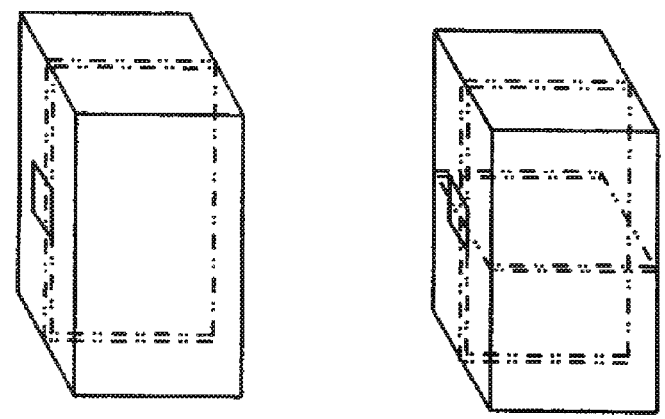
Fig. 13

FEATHERWEIGHT  LIGHTWEIGHT  WELTERWEIGHT  MIDDLEWEIGHT  LIGHT HEAVYWEIGHT  HEAVYWEIGHT  SUPER HEAVYWEIGHT

FEATHERWEIGHT  LIGHTWEIGHT  WELTERWEIGHT  MIDDLEWEIGHT  LIGHT HEAVYWEIGHT  HEAVYWEIGHT  SUPER HEAVYWEIGHT

PASSIVE TAMPER-RESISTANT SEAL AND APPLICATIONS THEREFOR

CROSS-REFERENCE TO RELATED APPLICATIONS

This application is a continuation-in-part of U.S. application Ser. No. 12/081,444 filed on Apr. 16, 2008 now issued under U.S. Pat. No. 8,063,779, the entire disclosure of which is incorporated herein by reference.

FIELD OF THE INVENTION

The present invention relates generally to tamper-resistant packaging and in particular to a passive tamper-resistant seal and applications therefor.

BACKGROUND OF THE INVENTION

Tamper-resistant packaging is well known in the art. In the pharmaceutical industry, containers holding medicines are designed so that when the contents of the containers are accessed, clear visual indications signifying container access are provided.

In other environments, providing such visual tamper-resistance on containers is difficult. As a result, in these environments manual inspection of containers is required. For example, at border crossings and other inspection points, large containers carried by trucks and ships are typically manually inspected. Containers of this nature generally provide no visual indication signifying if the containers have been opened. This of course slows the inspection process as all containers must be inspected.

U.S. Pat. No. 6,747,558 to Thorne et al. discloses a device for sealing and tracking a container. The device includes a bolt which extends through openings in a latch mechanism on the container. The bolt also passes through spaced coils of the device. The device uses one coil to generate a magnetic field, while monitoring the corresponding magnetic field induced in the other coil. Tampering with the bolt affects the magnetic field, which in turn permits the device to detect the tampering. The device periodically transmits wireless signals which can be remotely received for purposes of tracking the container and monitoring the integrity of the device.

Although the Thorne et al. device allows tampering to be detected, it is complicated and costly to manufacture. As will be appreciated, there exists a need for an improved mechanism that allows secure uncompromised containers to be differentiated from compromised containers.

It is therefore an object of the present invention to provide a novel passive tamper-resistant seal and novel applications therefor.

SUMMARY OF THE INVENTION

Accordingly, in one aspect there is provided a container comprising a container body; and a seal on at least a portion of said container body, said seal including an antenna and a tag tuned to said antenna, said tag becoming detuned when said antenna is compromised during opening of said container.

In one embodiment, the tag outputs a signature in response to a scanning signal when tuned to the antenna. In particular, the tag resonates in response to the scanning signal when tuned to the antenna and outputs a code unique to the tag. The scanning signal is of a predetermined frequency.

The antenna includes a main antenna portion and at least one break-away portion coupled to the main antenna portion. The at least one break-away portion separates from the main antenna portion when the container is compromised resulting in the tag becoming detuned from the antenna. The at least one break-away portion is coupled to the main antenna portion by one-time break-away contacts.

In one embodiment, the main antenna portion is provided on a door of the container and wherein the at least one break-away portion is provided on a doorjamb of the container.

In another embodiment, the tag and antenna are disposed on a substrate adhered to the container.

According to another aspect there is provided a radio frequency identification seal comprising an antenna including a main antenna portion and at least one break-away portion; and an RFID tag coupled and tuned to said antenna, said RFID tag outputting a signature in response to a scanning signal when tuned to said antenna.

The radio frequency identification seal provides advantages in that a determination can be made as to whether a container has been compromised simply by scanning the RFID seal with a scanning signal of the appropriate frequency. If the container has not been compromised, the RFID seal outputs a unique code in response to the scanning signal. If the container has been compromised resulting in one or more break-away portions being separated from the main antenna portion, the RFID seal will not output the unique code in response to the scanning signal thereby clearly to identify the container as being compromised.

BRIEF DESCRIPTION OF THE DRAWINGS

Embodiments will now be described more fully with reference to the accompanying drawings in which:

FIG. 12b is a schematic diagram of the RFID seal shown in FIG. 12a;

FIG. 13 shows other boxes or cartons including RFID seals;

FIG. 18a shows an RFID seal affixed to a pressure pipe;

FIG. 18b is an enlarged cross-sectional view of a portion of the pressure pipe of FIG. 18a;

DETAILED DESCRIPTION OF THE EMBODIMENTS

Figure 1:
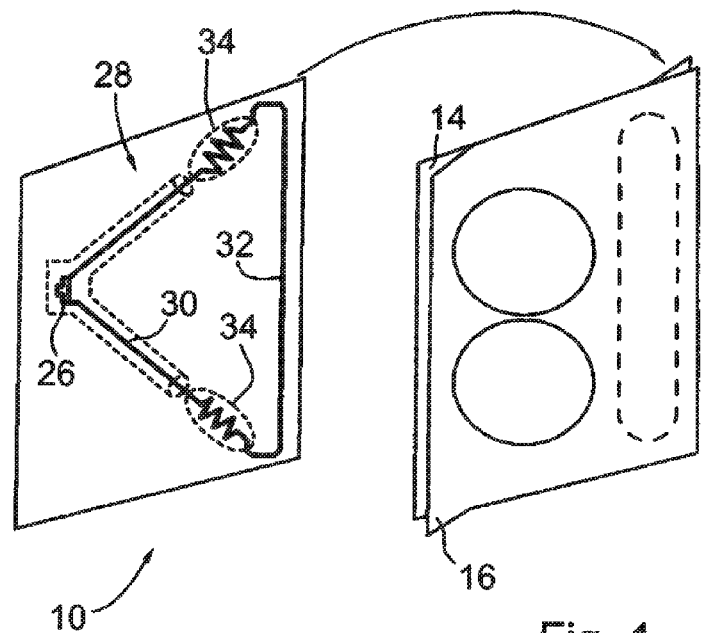
FIG. 1 is an exploded perspective view of a passive radio frequency identification (RFID) seal used to secure a container.
Figure 2:
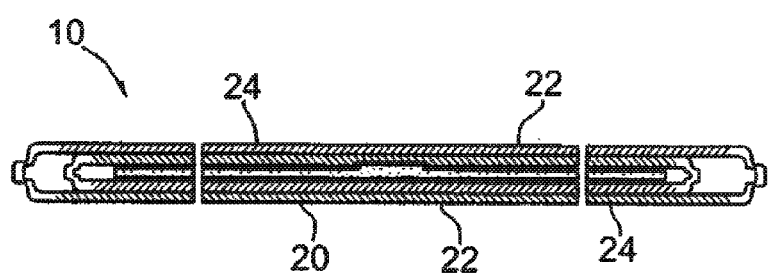
FIG. 2 is a cross-sectional view of the RFID seal of FIG. 1.

Turning now to FIGS. 1 and 2, a passive radio frequency identification (RFID) seal used to secure a container, box, carton or other enclosure is shown and is generally identified by reference numeral 10. As can be seen, in this embodiment the RFID seal 10 is generally rectangular and is sandwiched between a pair of cover sheets 14. The outer surfaces of the cover sheets 14 are covered by one time peal-off labels 16. Removal of the labels 16 exposes high-tack adhesive allowing the RFID seal 10 to be secured to the container.

As can be seen in FIG. 2, the RFID seal 10 includes an inner printed electronic layer 20 formed of Kapton-Polymide film. The inner electronic layer 20 is sandwiched between intermediate layers 22 formed of radiolucent conductive spliced polyester/fluoropolymer film. Surrounding the intermediate layers 22 are outer vinyl gel-foam layers 24. The intermediate and outer layers 22 and 24 encapsulate the inner layer 20. Thus the inner electronic layer 20 is contained from ecological conditions outside the RFID seal 10.

The printed electronic layer 20 includes an RFID tag 26 and an antenna 28 generally taking the shape of a triangle. The antenna 28 is formed using fine German silver wire and comprises a main shielded antenna portion 30 and a break-away portion 32 coupled to the main antenna portion 30 by one-time, break-away contacts 34.

The RFID tag 26 is tuned to the antenna 28 so that when the RFID tag 26 is scanned by a signal at a predetermined frequency and the antenna 28 is intact, the RFID tag 26 resonates causing the RFID tag 26 to output a code unique to the RFID tag 26.

Figure 3A:
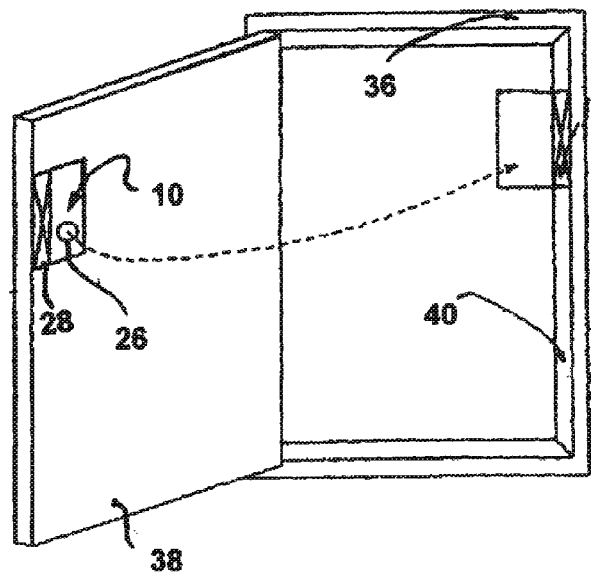
FIG. 3a is an end view of a container showing its door in an open position during installation of the RFID seal of FIG. 1.
Figure 3B:
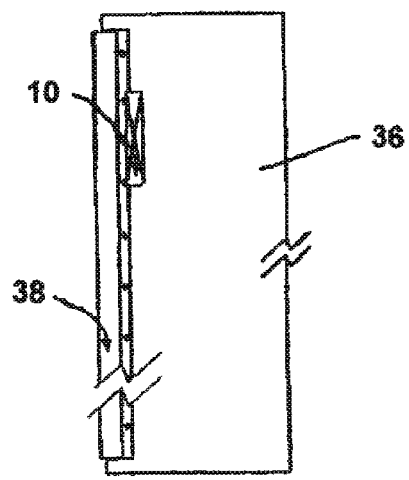
FIG. 3b is a side view of a portion of the container of FIG. 3a with the door in a closed position.

During installation of the RFID seal 10 on a container such as a cargo container 36, one of the labels 16 is removed from the RFID seal 10 and the RFID seal 10 is adhered to the inner leading edge of the container door 38 as shown in FIG. 3a. Once the container 36 has been loaded, the other label 16 is removed from the RFID seal 10 and the container door 38 is closed and pushed tight until the door touches the doorjamb 40 as shown in FIG. 3b. In this manner, the RFID seal 10 becomes adhered to both the container door 38 and the container body. The outer gel-foam layers 24 help to take up any variances between the door 38 and the doorjamb 40, when the door 38 is closed.

When the door 38 is opened, the one-time contacts 34 break, thereby, isolating the break-away antenna portion 32 from the main antenna portion 30. In this case, if the RFID tag 26 is scanned by a signal at the predetermined frequency, the RFID tag will not resonate as the tuning between the antenna 28 and the RFID tag 26 is lost. Hence the RFID tag 26 will not output the unique code. As will be appreciated, the RFID seal 10 allows an inspector to determine very quickly whether the container 36 has been compromised. If the container 36 is packed and sealed at a secure location, scanning the container 36 to determine if the RFID tag 26 outputs the unique code at border crossings and/or other inspection points allows an inspector to determine quickly whether the container 10 requires inspection.

Figure 4A:
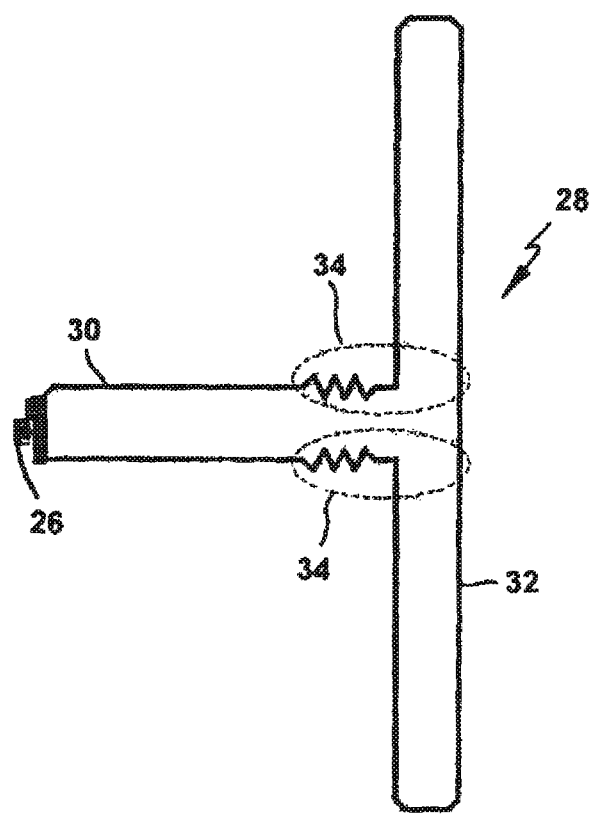
FIGS. 4a and 4b show alternative embodiments of RFID seals used to secure containers.
Figure 4B:
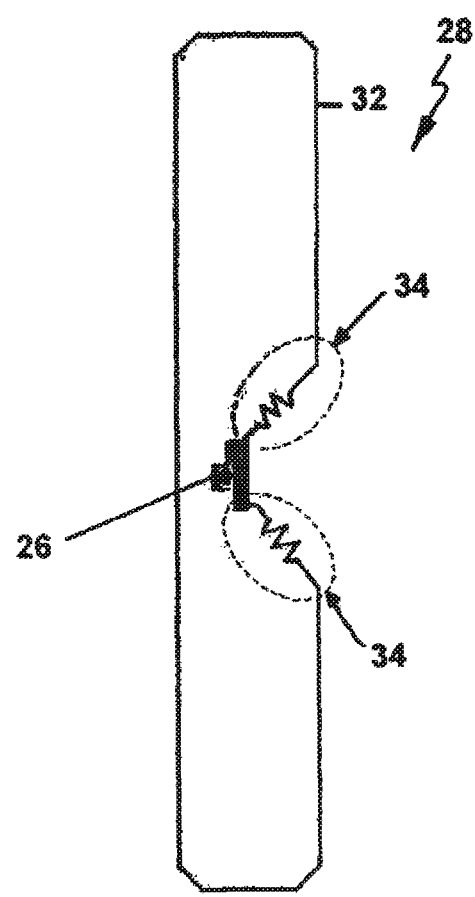

Although the RFID seal 10 is described above as having an antenna 28 that is generally triangular in shape, other antenna configurations are possible. FIGS. 4a and 4b show two alternative electronic layer designs including different shaped antennas 28 and different break-away contact locations. Also, the RFID seal 10 need not be rectangular in shape. The RFID seal 10 may take on any convenient geometric shape such as square, circular, triangular etc.

Figure 5:
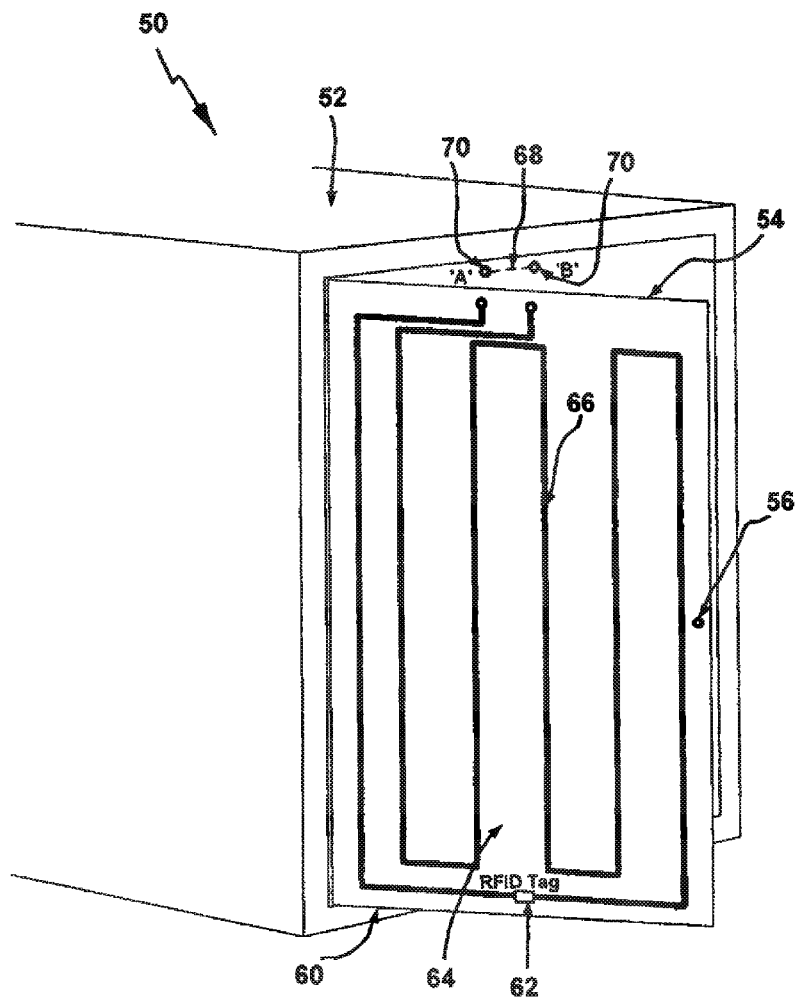
FIG. 5 is a perspective view of a container including another embodiment of an RFID seal.
Figure 6:
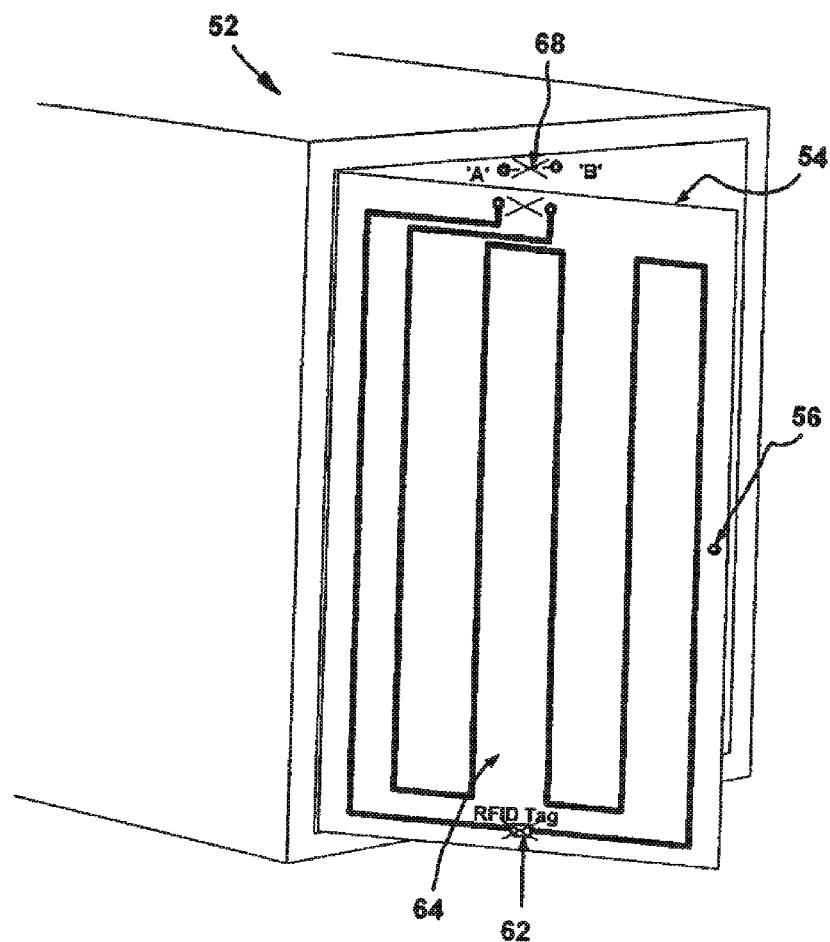
FIG. 6 is a perspective view of the container of FIG. 5 showing the RFID seal in a broken state.

Turning now to FIGS. 5 and 6, a container 50 including an alternative embodiment of an RFID seal is shown. As can be seen, container 50 in this embodiment includes a generally rectangular container body 52 having a door 54 at one end. The door 54 is hinged to the container body 52 allowing the door to swing between open and closed positions. A lock 56 is provided on the door 54 to allow the door to be locked in the closed position.

Similar to the previous embodiment, the RFID seal 60 includes an RFID tag 62 and an antenna 64. The antenna 64 is formed using fine German silver wire and comprises a main antenna portion 66 and a break-away portion 68 coupled to the main antenna portion 66 by one-time, break-away contacts 70. The main antenna portion 66 in this embodiment is latticed throughout the door 54. The break-away portion 68 is adhered to the container body 52 at the doorjamb.

When the door 54 is opened, the one-time contacts 70 break, thereby, isolating the break-away antenna portion 68 from the main antenna portion 66. Thus, if the RFID tag 62 is scanned by a signal at the predetermined frequency, the RFID tag will not resonate as the tuning between the antenna 64 and the RFID tag 62 is lost. Hence the RFID tag 62 will not output the unique code.

During installation of the RFID seal 60, the RFID tag 62 is tuned to the antenna 64 with the break-away antenna portion 68 free of the container doorjamb and coupled to the main antenna portion 66. Once the RFID tag 62 has been tuned, the break-away antenna portion 68 is removed from the main antenna portion 66 and is adhered to the doorjamb of the container body 52. The container 50 is then loaded with goods to be transported. Once the container 50 has been loaded, the door 54 is closed and locked. The one-time contacts 70 are then formed between the main antenna portion 66 and the break-away antenna portion 68 to complete the antenna 64. The RFID tag 62 is then scanned to confirm that the RFID tag outputs the unique code signifying that the RFID tag remains tuned to the antenna 64.

Figure 7:
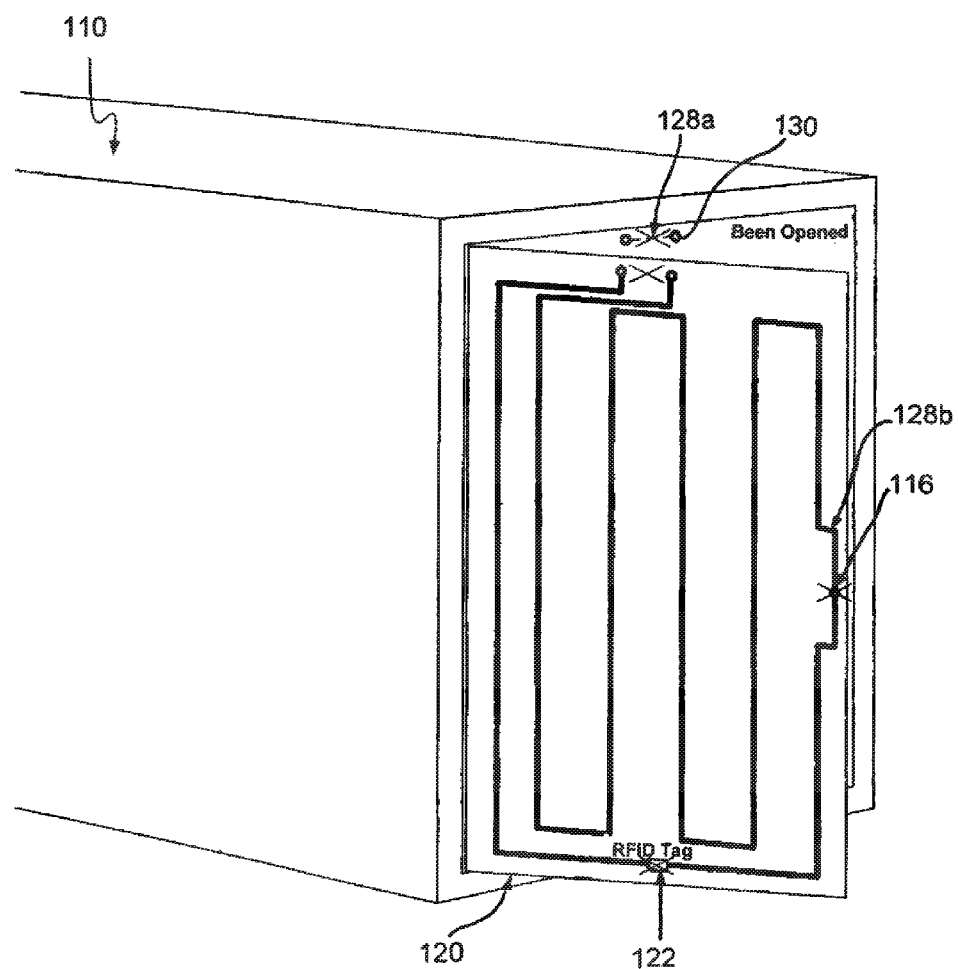
FIG. 7 is a perspective view of a container including yet another embodiment of an RFID seal.

FIG. 7 shows another embodiment of a container 110 including an RFID seal 120 comprising an RFID tag 122 and an antenna 124. In this embodiment, the antenna 124 includes, a main antenna portion 124, a break-away antenna portion 128a on the doorjamb of the container body 112 as well as a break-away antenna portion 128b adjacent the lock 116. The break-away antenna portions 128a and 128b are coupled to the main antenna portion 124 by one-time, break-away contacts 130. When the door 114 is opened, one or both break-away antenna portions 128a and 128b separate from the main antenna portion 126 via the one-time contacts 130. As a result, the RFID tag 122 becomes detuned and hence does not output the unique code when scanned.

Figure 8:
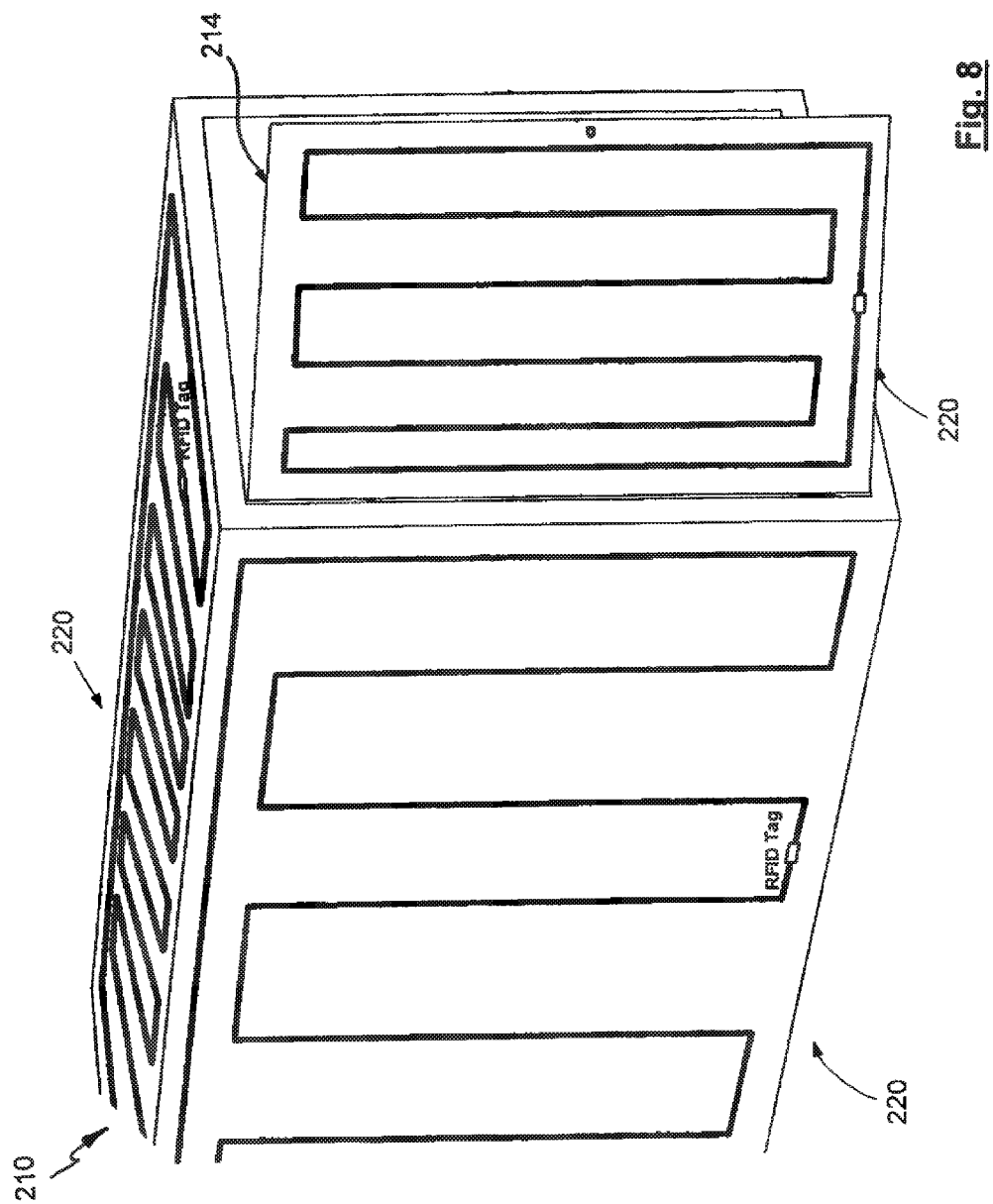
FIG. 8 is a perspective view of a container including a plurality of RFID seals.

FIG. 8 shows yet another embodiment of a container 210 including a container body 212, a door 214 and a plurality of RFID seals 220 similar to the RFID seal 10 shown in FIGS. 1 and 2. As can be seen, in addition to the door 214, the top, sides and bottom of the container body 212 include RFID seals 220.

Figure 9:
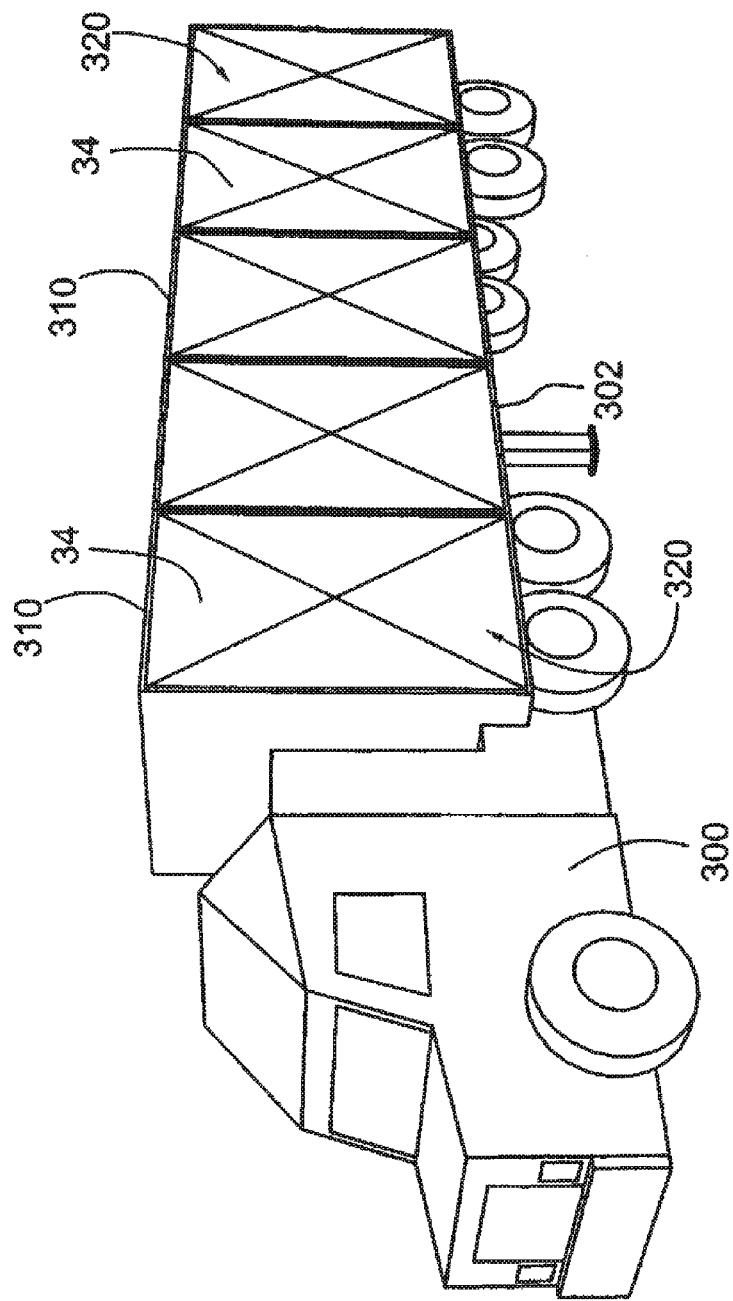
FIG. 9 is a perspective view of a transport truck hauling a trailer having a plurality of containers, each container including a RFID seal.
Figure 10:
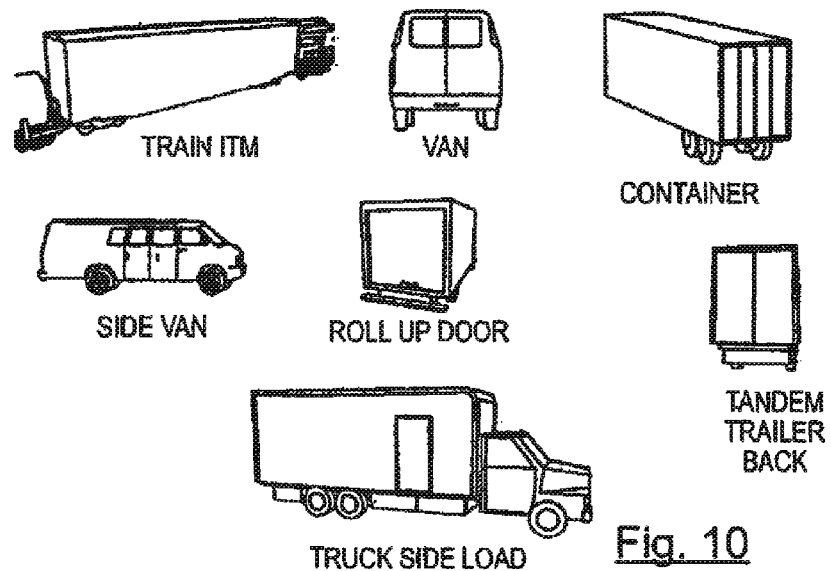
FIG. 10 shows other vehicles having storage capabilities on which RFID seals can be mounted.

Although the above embodiments show the RFID seals used to secure containers, those of skill in the art will appreciate that the RFID seals may be used to secure other containment devices. For example, FIG. 9 shows a transport truck 300 hauling a trailer 302 having containers 310 thereon. Each container 310 has a door 314 including an RFID seal 320 of the type shown in FIGS. 5 and 6. FIG. 10 shows other vehicles having storage capabilities on which RFID seals can be mounted.

Figure 11A:
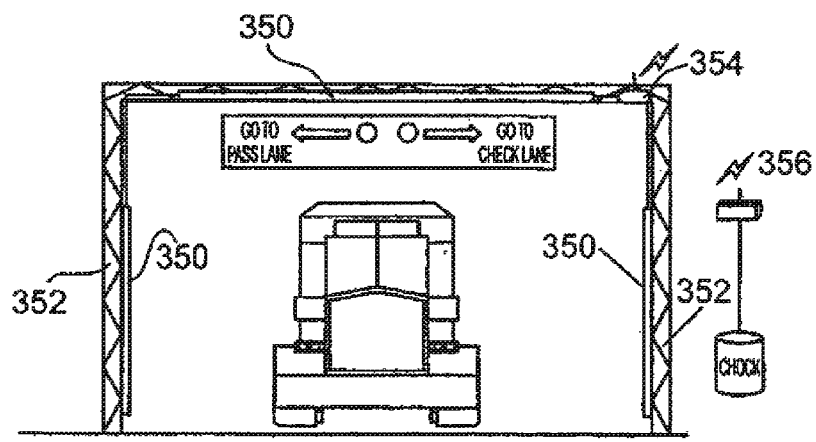
FIG. 11a shows a station for reading RFID seals mounted on trucks and/or other vehicles.

In situations where the RFID seals are used on trucks and/or other vehicles, stations such as that shown in FIG. 11a may be used to check the integrity of the RFID seals. In this case, RFID reader antennae 350 are mounted on a frame structure 352 through which trucks and vehicles pass allowing RFID seals carried by the trucks and vehicles to be read. The results of the RFID seal reads in this embodiment are transmitted by a wireless transmitter 354 mounted on the frame structure 352 to a central location 356 for verification.

Figure 11B:
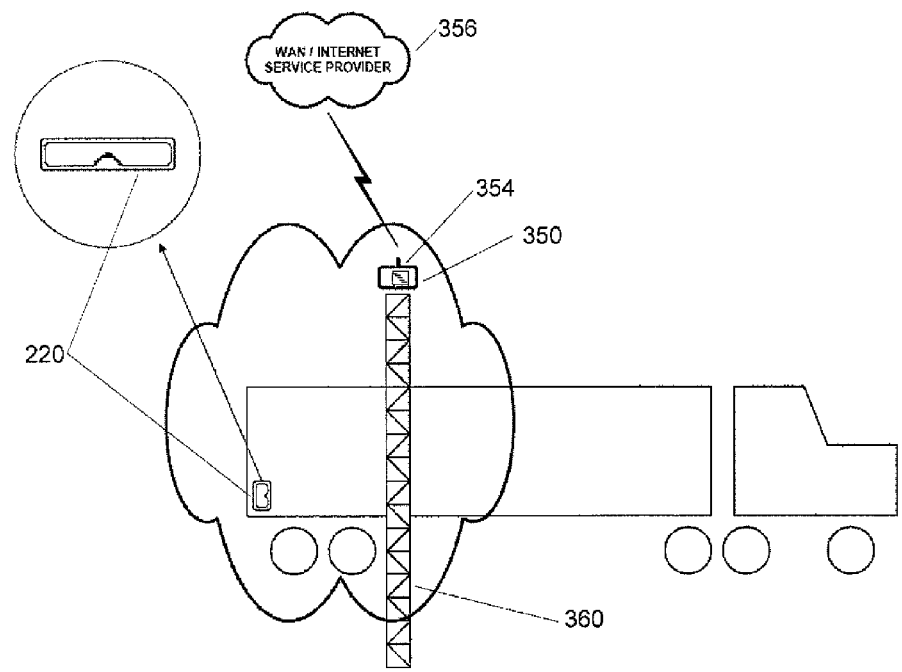
FIG. 11b shows structure for reading RFID seals mounted on trucks and/or other vehicles.

RFID reader antennae 350 may also be placed on highway entrance structures, main roadway lighting poles and entrances/exits to trucking marshalling yards where containers are transferred between vehicles in order to check the integrity of the RFID seals 220 during transport. For example, as shown in FIG. 11b, the RFID reader antenna 350 is mounted on a roadway structure 360 through which trucks and vehicles pass allowing the RFID seals 220 on the trucks and vehicles to be read. The results of the RFID seal reads are similarly transmitted by a wireless transmitter 354 to a central location 356 for verification. Typically, RFID reader antennae 350 are mounted on various structures over a coverage area and communicate with the central location 356. The RFID reader antennae 350 collectively monitor RFID seals 220 on vehicles passing through the coverage area to allow container intrusions within the coverage area to be detected quickly.

Figure 12A:
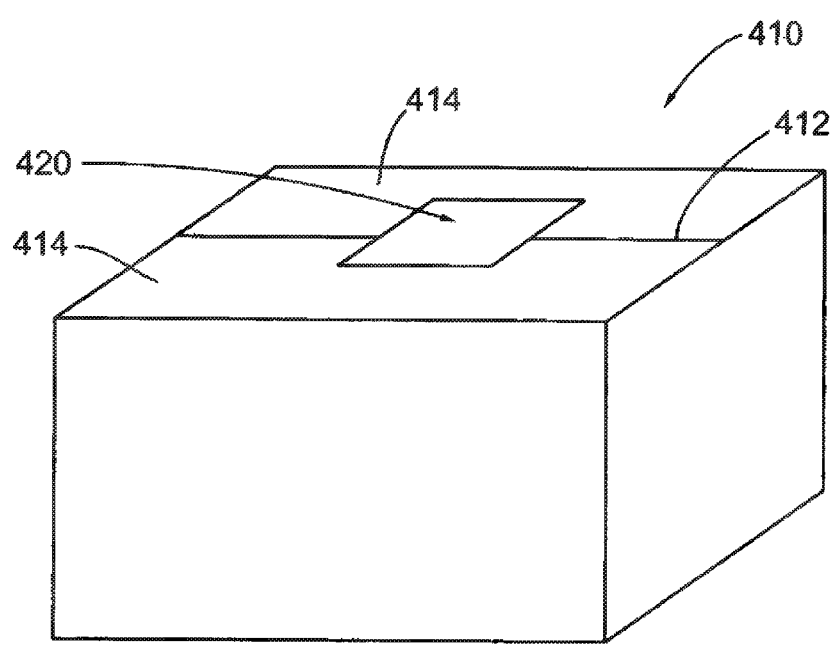
FIG. 12a is a perspective view of a box or carton including an RFID seal.
Figure 12B:
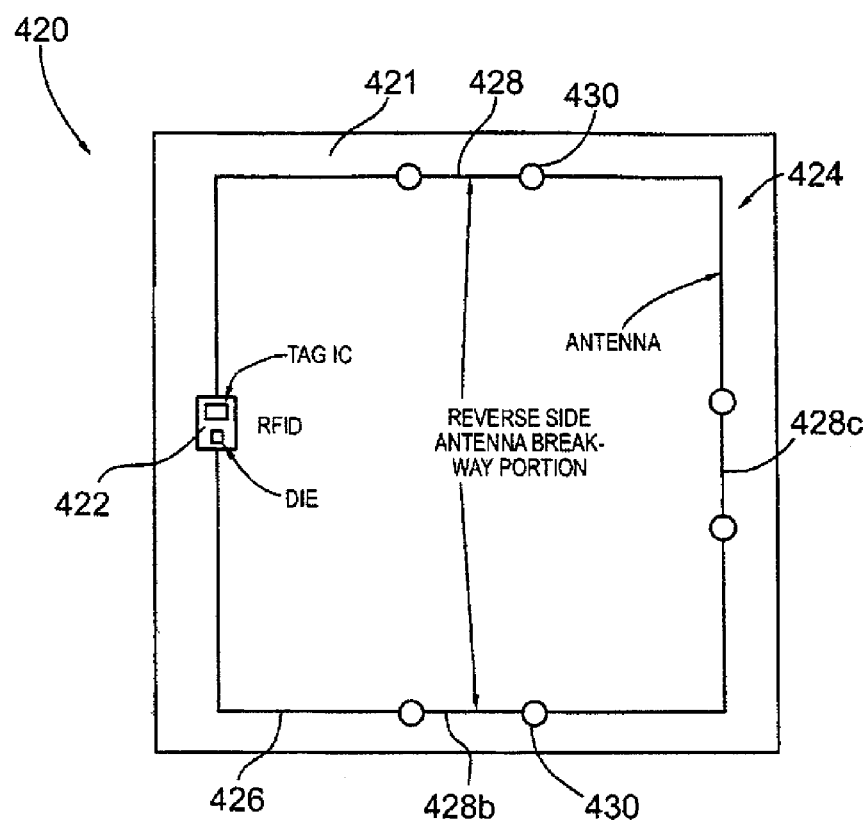

FIGS. 12a and 12b show a container 410 in the form of a box or a carton including an RFID seal 420. In this embodiment, the box 410 is rectangular or square box and has a seam 412 separating the two flaps 414 defining the top of the box. The RFID seal 420 in this case includes a substrate 421 that is adhered to the top of the box 410 and spans the seam 412. An RFID tag 422 and an antenna 424 are also adhered to the substrate 421. The RFID tag 422 is pre-tuned to the antenna 424. The antenna 424 includes a main antenna portion 426 and a plurality of break-away antenna portions 428a, 428b and 428c at spaced locations along the length of the antenna 424. The break-away antenna portions 428a, 428b and 428c are coupled to the main antenna portion 426 by one-time break-away contacts 430. Two of the break-away antenna portions 428a and 428b span the seam 412. In this manner, when the box 410 is opened along the seam 412 and the RFID seal 420 is torn, one or more of the break-away antenna portions 428a, 428b and 428c separate from the main antenna portion 426 via the one-time break-away contacts 430. As a result, the RFID tag 422 becomes detuned and thus, provides no output when scanned at the predetermined frequency.

Figure 14A:
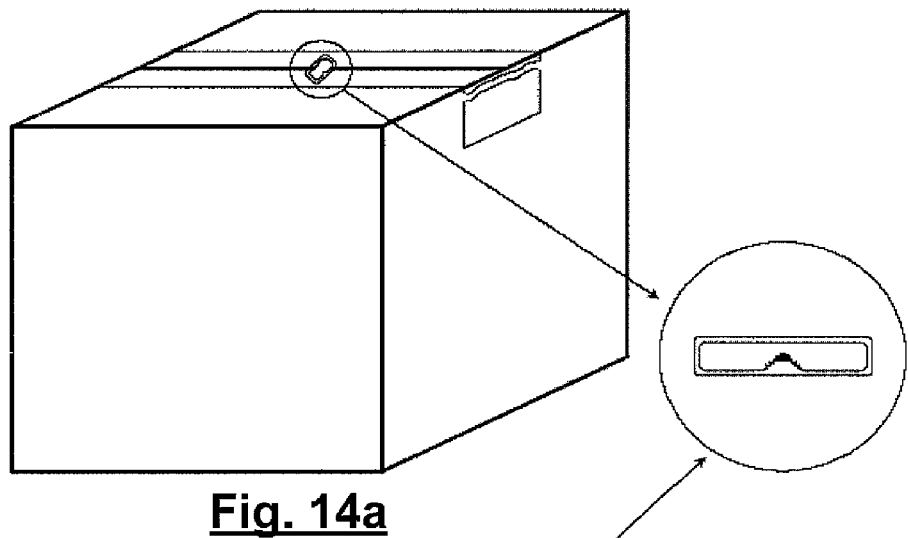
FIGS. 14a and 14b show further boxes or cartons including RFID seals.
Figure 14B:
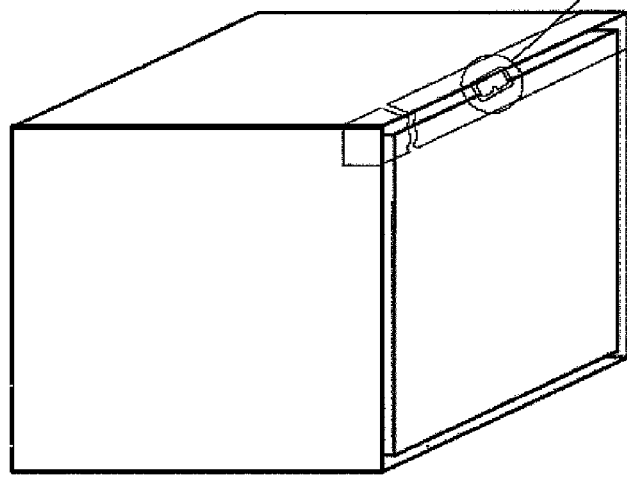
Figure 15A:
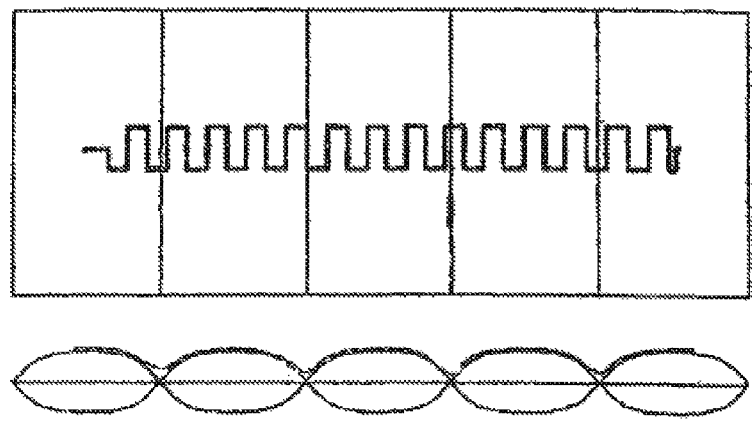
FIGS. 15a and 15b show packing material for use in boxes or cartons of the types shown in FIGS. 12a, 13, 14a and 14b including RFID seal antennae.
Figure 15B:
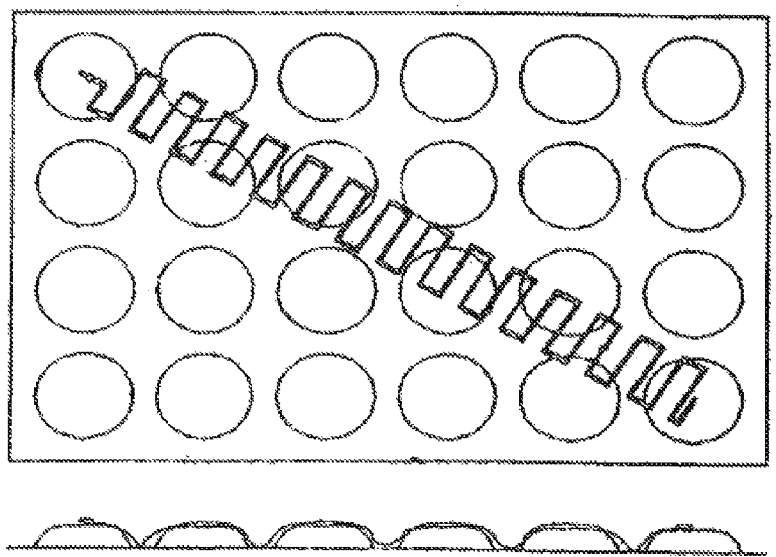

Although the above-embodiment shows the RFID seal being used to secure a square box by engaging the flaps of the box, those of skill in the art will appreciate that the RFID seal may be used to secure other box or carton configurations. For example, FIGS. 13, 14a and 14b show other containers incorporating RFID seals. In the embodiments of FIGS. 14a and 14b, RFID seals are used to secure retail store merchandise that has been repackaged, rewrapped or re-boxed within the retail store. The customer or reseller can thus, ensure that the merchandise has not been tampered with. In the embodiments of FIGS. 12, 13, 14a and 14b, the break-away antenna portions of the RFID seal antennae need not engage the boxes or cartons. Rather, the break-away antenna portions can be incorporated into packing material placed into the boxes or cartons as shown in FIGS. 15a and 15b. In these cases, the break-away antenna portions are coupled to the main antenna portions on the containers so that when the containers are opened, the break-away antenna portions separate from the main antenna portions resulting in the RFID seals becoming detuned.

As will be appreciated, in the above-described embodiments, the RFID seals allow containers to be inspected to determine if a container has been compromised quickly and easily simply by scanning the RFID seals with a signal at the appropriate frequency. Containers whose RFID seals do not output a unique code in response to the scanning signal are immediately recognized as having been tampered with. Decisions to inspect containers can thus be made quickly and accurately increasing the efficiency of inspection points such as border crossings.

While specific examples of containers are shown, those of skill in the art will appreciate that the containers may take virtually any form. Also, while specific reference is made to RFID seals, those of skill in the art will appreciate that other types of passive seals that can be tuned to an antenna and are responsive to scanning signals can of course be used. Furthermore, the RFID seals may be used in other environments to allow access or intrusion to be detected.

Figure 16:
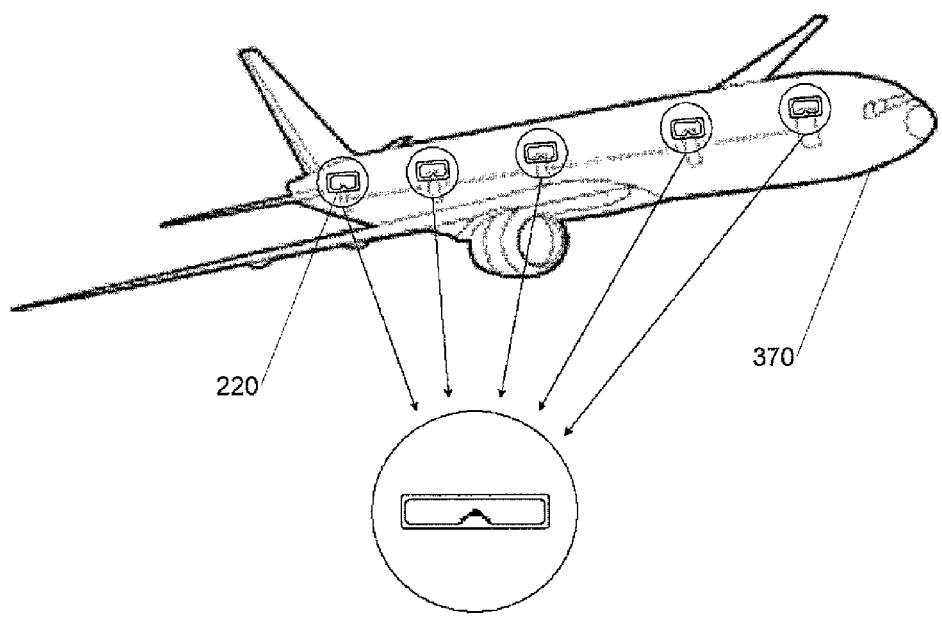
FIG. 16 shows RFID seals affixed to an aircraft.

For example, FIG. 16 shows RFID seals 220 used to secure an airplane 370. As can be seen, the RFID seals 220 are attached to the outer shell or fuselage of the airplane 370 at access points such as linkages, undercarriage housings, viewing/maintenance access panels, non-access hatches and emergency doors. The RFID seals 220 are affixed to the aircraft in the manner described previously such that when, for example, an emergency door is opened, the break-away antenna portions separate from the main antenna portion via the one-time break-away contacts. As a result, the RFID seals 220 become detuned thus, providing no output when scanned at the predetermined frequency. Those of skill in the art will appreciate that use of the RFID seals is not limited to aircraft and that the RFID seals may be affixed to virtually any type of vehicle. For example, RFID seals 220 may also attached to the hatch ways, hatch covers and protective housing lids of a boat or cargo shipping vessel.

Figure 17:
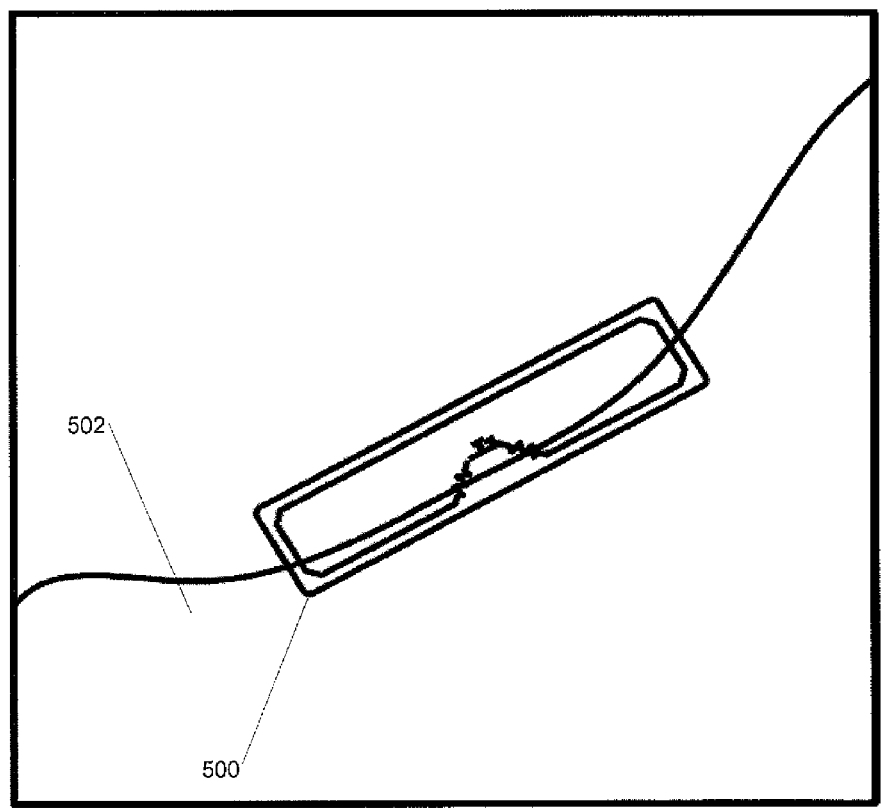
FIG. 17 shows an RFID seal affixed to a structural material.

While the above examples show the use of RFID seals to secure containers of various forms, vehicles, aircraft etc. to provide an indication of access or intrusion, the RFID seals may also be used in alternative environments. For example, the RFID seals may be applied to structure materials and used to detect failure in structural materials. As shown in FIG. 17, an RFID seal 500 is affixed to a structural material 502 via a substrate at a location prone to fatigue. Fatigue may take the form of cracks that may lead to dislocation and slow structure separation, protrusions, chevron buckling, hair-line fractures, corrosion notching, skin notching and skin stiffness. In this embodiment, the substrate is coated polyvinylidenefluoride (PVDF) which ruptures at 0.03% strain. When the substrate ruptures as a result of fatigue of the structure material 502, the one-time break-away contacts break, thereby isolating the break-away antenna portion from the main antenna portion as previously described. Thus, when the RFID seal 500 is scanned by a scanning signal at the predetermined frequency, the RFID seal does not resonate and does not output a signature allowing failure in the structural material 502 to be detected.

Figure 18:
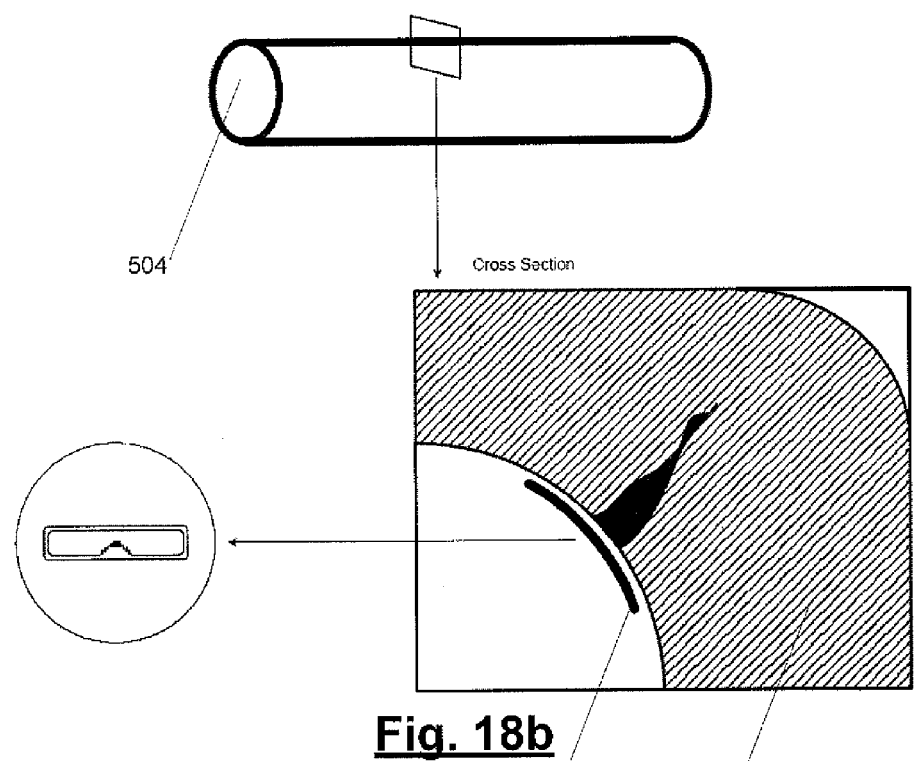

FIGS. 18*a* and 18*b* show the RFID seal 500 applied to the inside of a pressure pipe 504 at a location prone to failure and a failure in the pressure pipe 504 at the location of RFID seal application.

Although a specific substrate form is described, those of skill in the art will appreciate that alternatives are available. In another embodiment, the substrate is formed of a rigid ceramic or mica having a thickness of about 0.5 to 1.00 mm that is covered with a protective coating layer. The substrate in this embodiment ruptures in response to fatigue in the structural material causing the one-time break-away contacts to break and detune the RFID seal. In yet another embodiment, the substrate is formed of elastomeric, polyamide or acrylnitric material. As will be apparent the substrate material that is selected depends on the ecological conditions of the application. Also, the substrate need not rupture but rather may be formed of a material that stretches or elongates in response to structural material fatigue resulting in breaking of the one-time break-away contacts and detuning of the RFID seal.

As will be appreciated by those of skill in the art, in certain cases, fatigue may be not be visible with the naked eye. Use of RFID seals allows such structural fatigue to be detected early and inexpensively obviating the need for expensive ultrasonic scanning devices.

Figure 19:
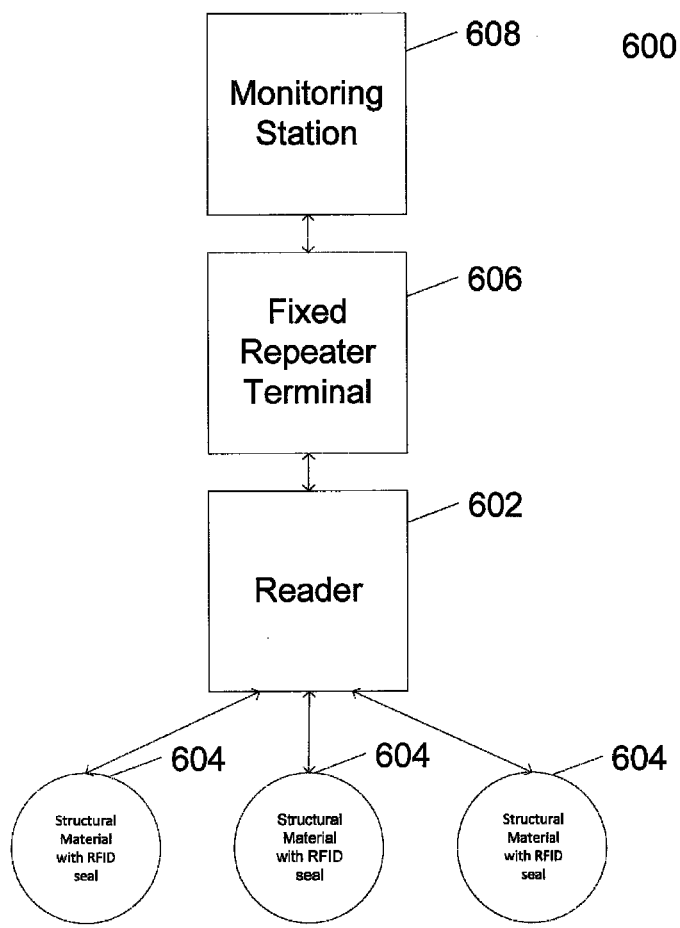
FIG. 19 is a flowchart of a network scanning system.

RFID tag scanning may be performed locally using a hand-held reader or as shown in FIG. 19, using a networked scanning system 600. System 600 comprises RFID readers 602 which output scanning signals to RFID seals affixed to structural material 604. In response, the RFID seals output signatures if no failure is present at their locations when scanned by the readers 602. The readers 602 transmit the read signatures to a fixed repeater terminal 606 that transmits the signatures to a monitoring station 608 over a communications links such as for example the Internet or other suitable wired or wireless network. The monitoring station 608 transmits instructions to the repeater terminal 606 which in turn instructs the readers 602 to output scanning signals to the scan the RFID seals on the structural material 604. Thus, system 600 allows for polling of RFID seals to track failure in structural material 604.

Figure 20:
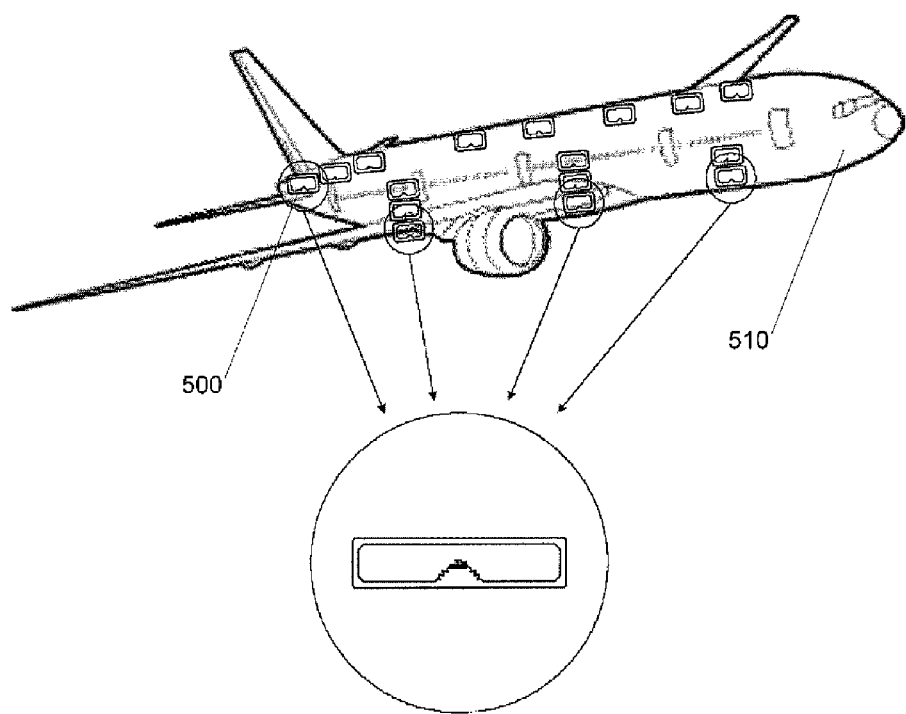
FIGS. 20 and 21 show RFID seals affixed to aircraft.
Figure 21:
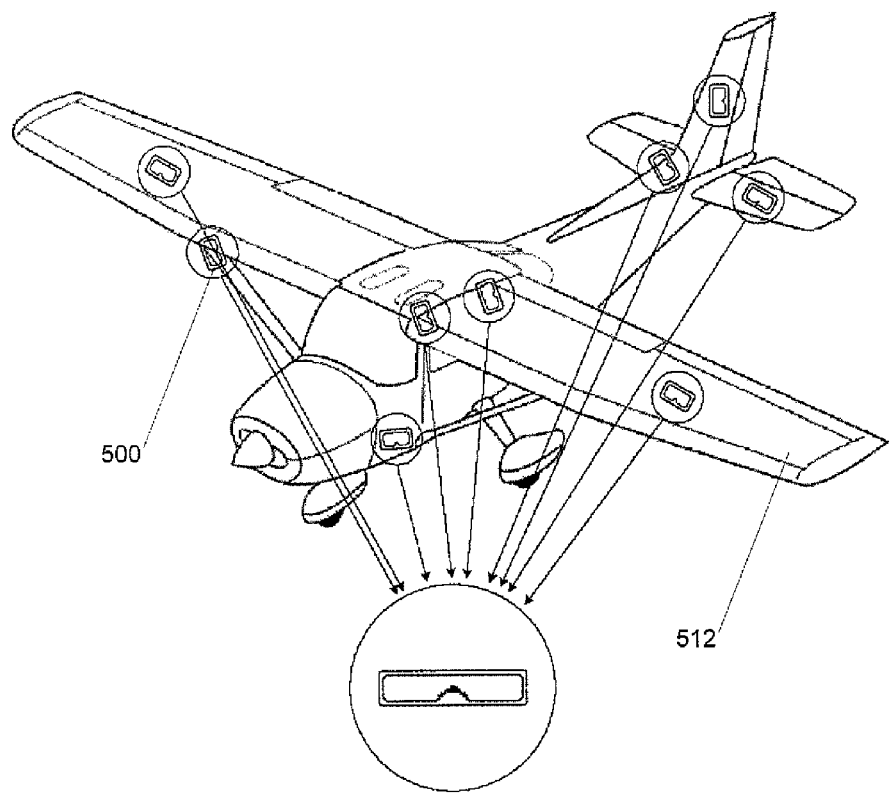
Figure 22:
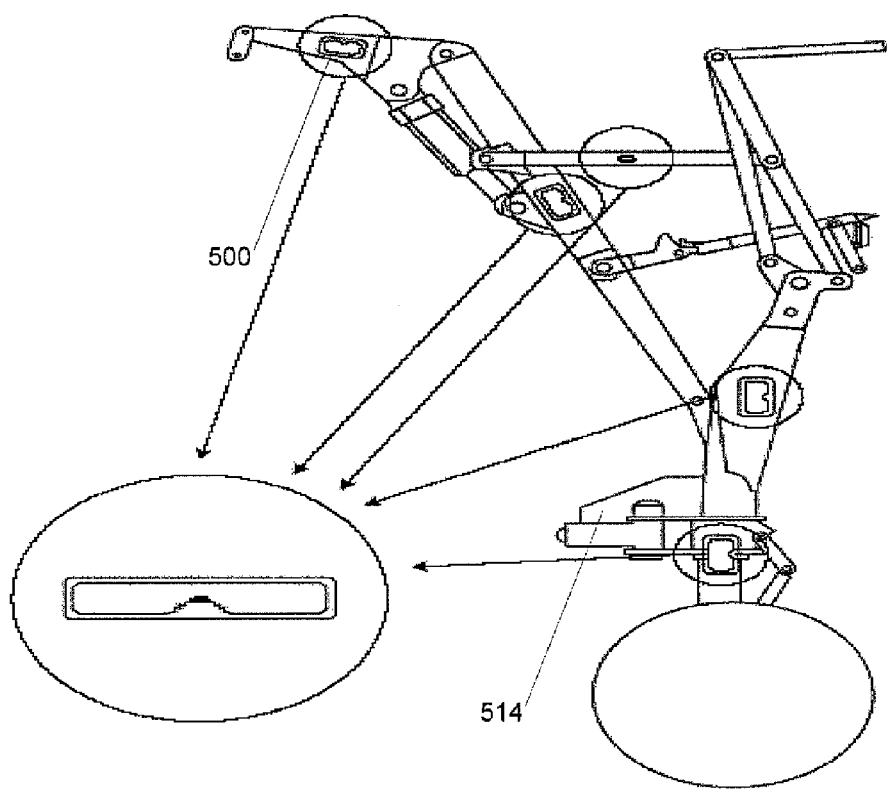
FIG. 22 shows RFID seals affixed to an aircraft undercarriage.

As shown in FIGS. 20 to 22, RFID seals 500 can be used to detect failures on airplanes 510. In FIG. 21, RFID seals 500 are shown strategically placed internally throughout the frame of an airplane 510 at extreme stress locations, e.g. wings, fuselage, tail, landing gear, longerons (stringer or stiffener), spars and ribs. As shown in FIGS. 21 and 22, RFID seals 500 are placed at strategic stress locations to detect failure on light airplanes 512 as well as on undercarriages 514 of aircraft.

Figure 23:
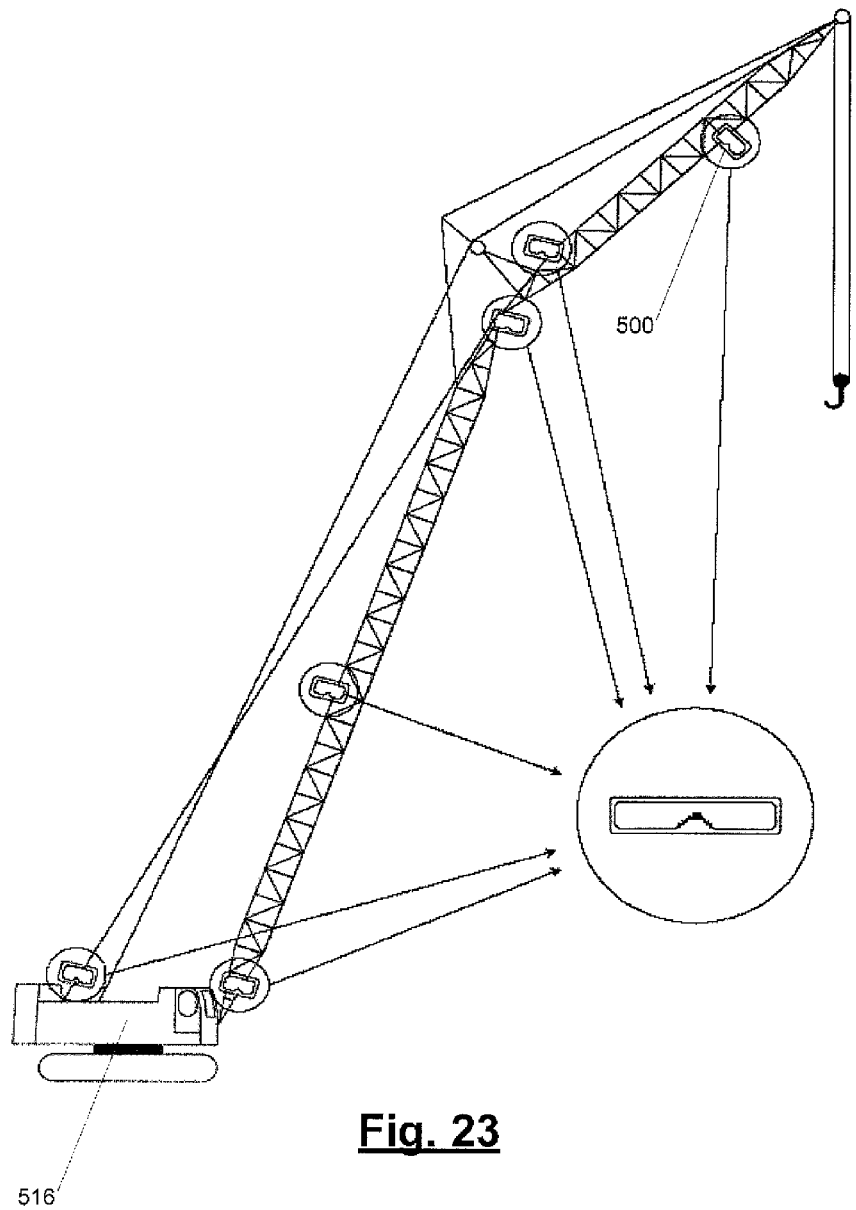
FIG. 23 shows RFID seals affixed to a crane.

As shown in FIG. 23, RFID seals 500 may also be used to detect failures on cranes 516. In this application, RFID seals 500 are placed at stress points on the crane, e.g. boom, main trunnion support, counterweight, welding points, welding points, and lifting harness.

Figure 24:
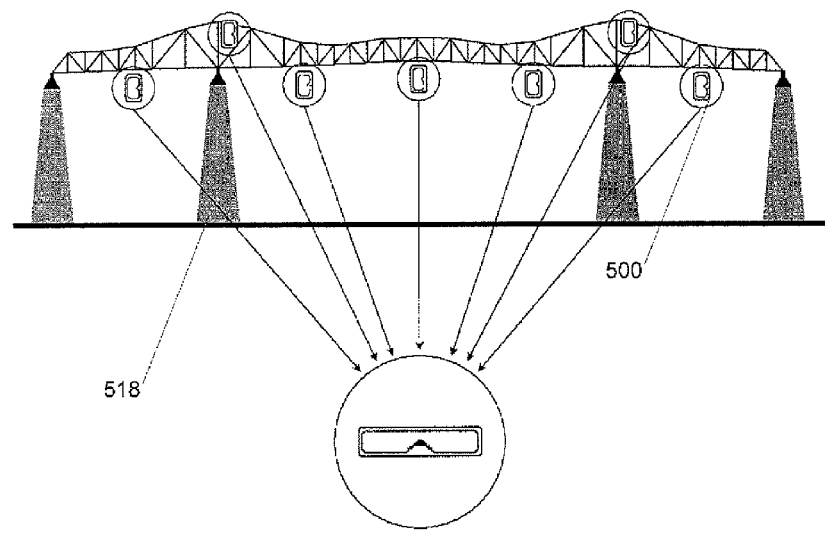
FIG. 24 shows RFID seals affixed to a bridge.

As shown in FIG. 24, RFID seals 500 may also be used to detect failures on a bridge 518. In this application, RFID seals 500 are placed at possible failure points of the bridge, e.g. main spans, pad bearings, parapets, expansion joints, road decking.

Figure 25:
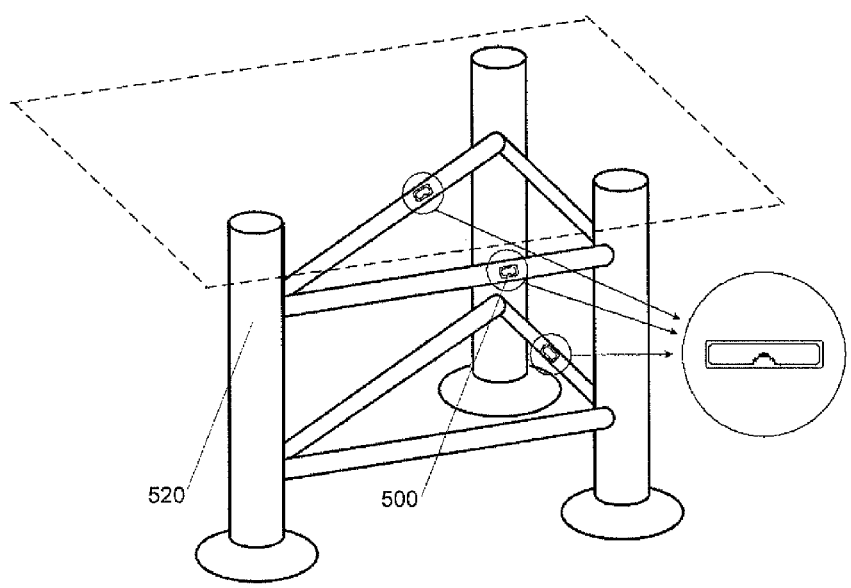
FIG. 25 shows RFID seals affixed to a drilling rig.
Figure 26:
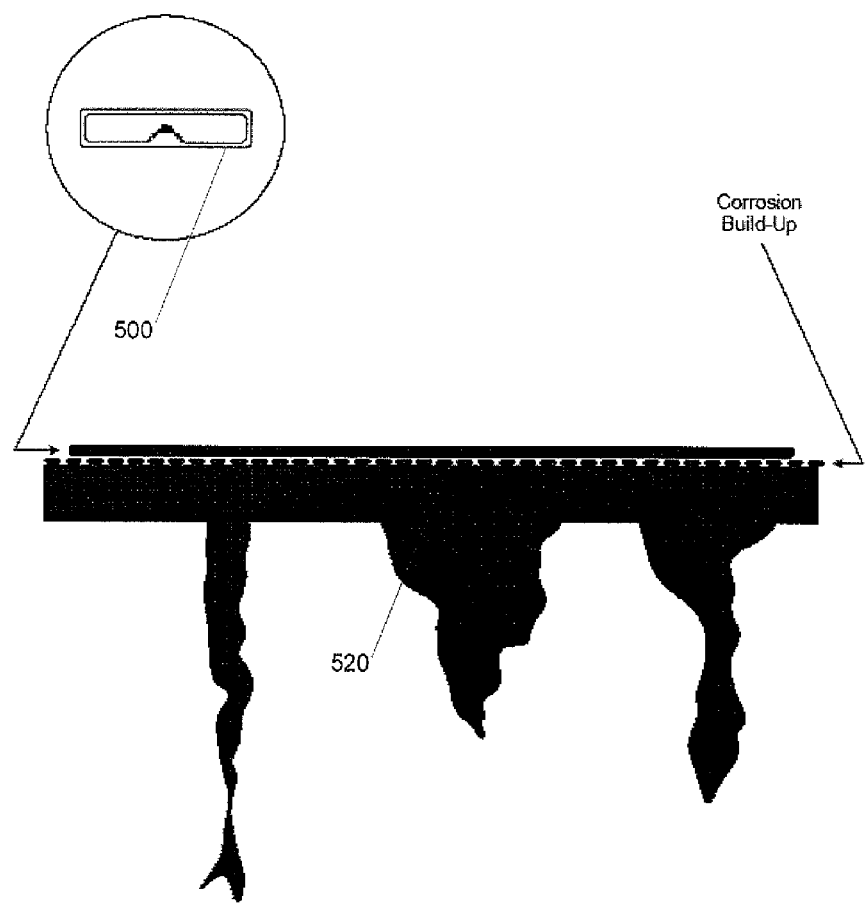
FIG. 26 is an enlarged view of a submersible support forming part of the drilling rig of FIG. 25.

As shown in FIG. 25, RFID seals 500 may also be used to detect failures on drilling rigs 520 for off-shore oil/gas drilling. In this application, RFID seals 500 are affixed to the submersible supports of the drilling rig 520 which are exposed to waves as well as to atmospheric conditions that may cause failure due to corrosion and resulting destructive structural erosion. FIG. 26 show corrosion on one of the submersible supports of the drilling rig 520 and resulting fatigue. RFID seals may also be affixed to bridge footings and bridge/pier fastening, strapping and anchors where corrosion may also occur.

Figure 27:
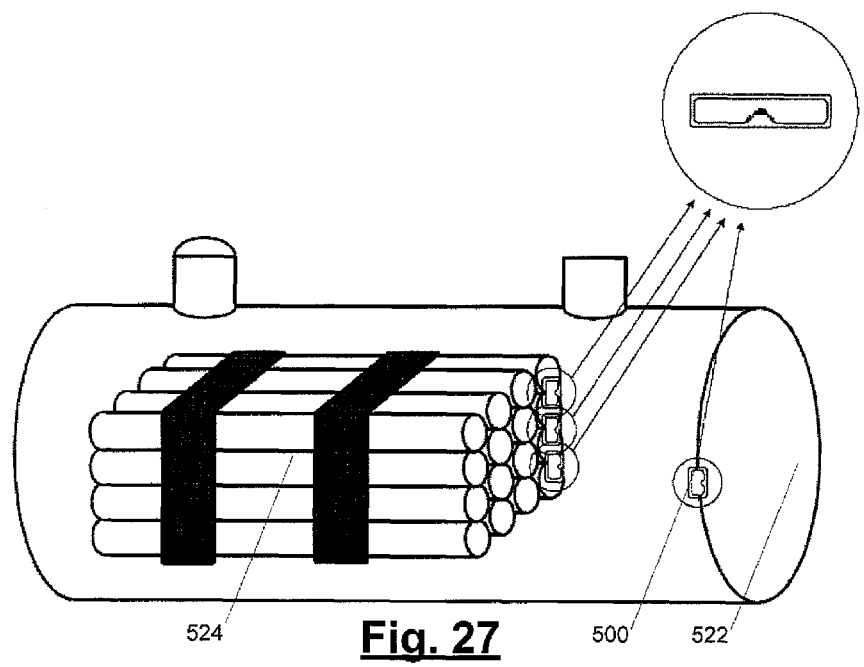
FIG. 27 shows RFID seals affixed to a pressure vessel and to fuel rod casements therein.

As shown in FIG. 27, RFID seals 500 may also be used to detect failures in boilers 522 and fuel rod casements 524 in nuclear power plants. These areas are in hazardous high radiation zones and cannot be inspected visually without significant personal protective equipment which is time and cost expensive. The RFID seals 500 allow for failure detection without requiring visual inspection.

Figure 28:
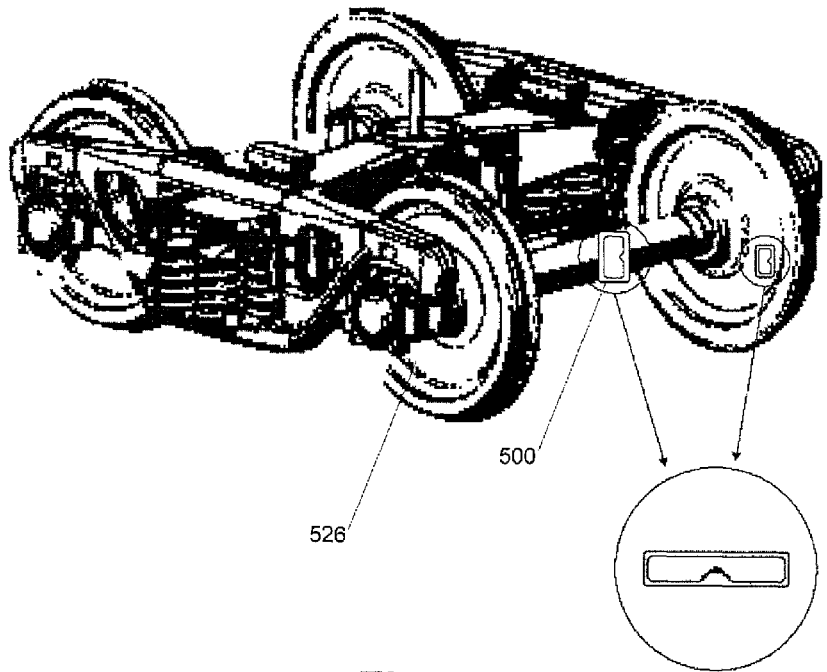
FIG. 28 shows RFID seals affixed to a railway dolly.

As shown in FIG. 28, RFID seals 500 may also be used to detect failures on railway dolly assemblies 526 at possible fatigue points rather than relying on the conventional and subjective testing method that involves striking the wheel of the railway dolly assembly to detect a failure by noting changes in the resulting vibration tone.

Figure 29:
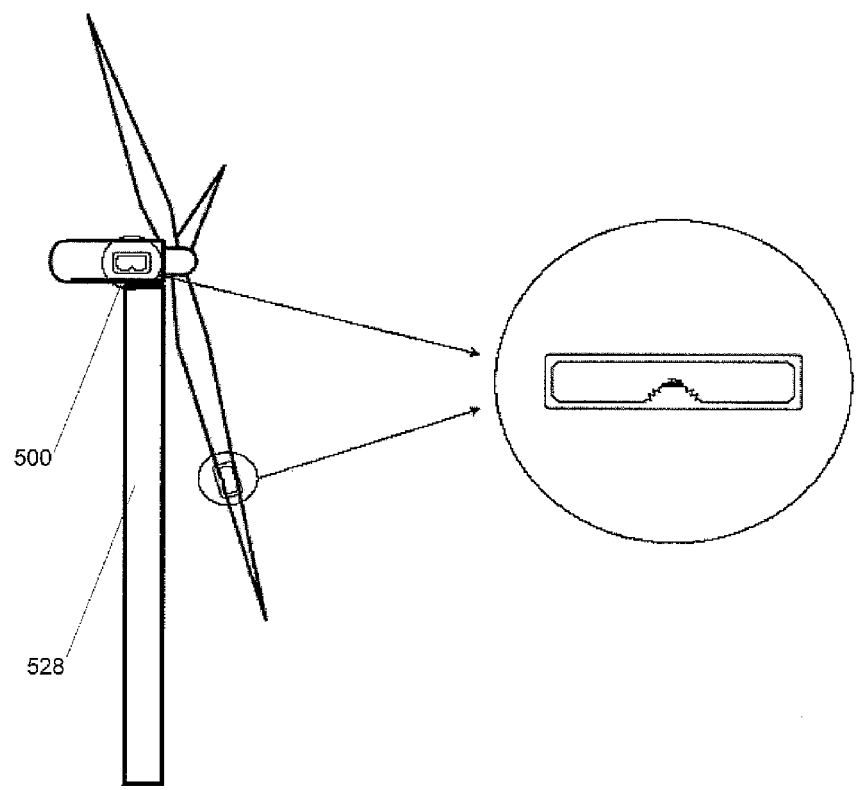
FIG. 29 shows RFID seals affixed to a wind turbine.

As shown in FIG. 29, RFID seals 500 may also be used to detect failure on wind turbines 528. In this application, RFID seals 500 are placed on the wind generators at failure points such as those which are subject to low-frequency fatigue strain creep caused by piezo-effect noise, e.g. blades, spindles and stanchions.

Figure 30:
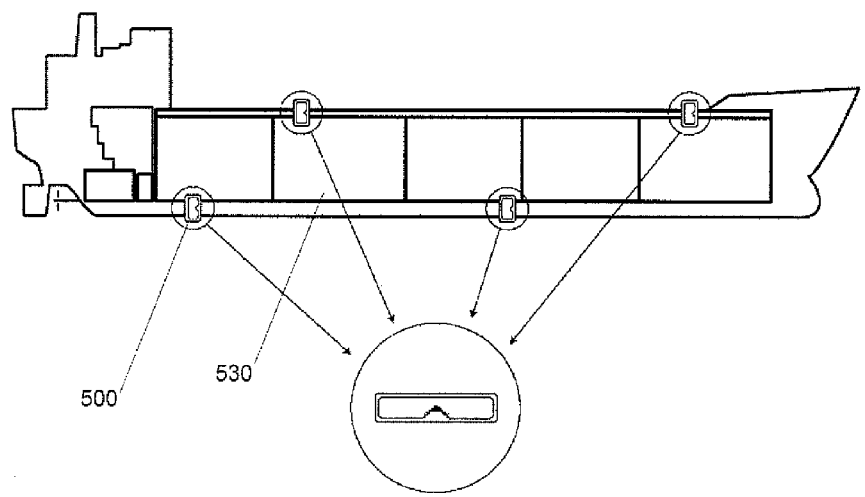
FIG. 30 shows RFID seals affixed to a cargo shipping vessel.

As shown in FIG. 30, RFID seals 500 may also be used to detect failures on shipping vessels 530 with single or double skins.

The RFID seals may also be used for failure detection in structural material testing. In material testing, failure may be caused by overheating, compression, torsion or tension impact loads. During testing of non-ferrous ductile materials such as, aluminum, copper and plastics, materials may return partially or wholly to their original shapes and thus, failure may not be detected after testing. In impacts involving more brittle ferrous materials, e.g. cast iron, spherulitic graphite (SG) cast iron, hardened steel, high strength alloys, ceramics and armor-toughened glass, the failure is typically evident but such is not always the case in impacts involving ductile materials. Affixing RFID seals to these ductile materials prior to testing enables testers to monitor structural failures in ductile materials.

Figure 31A:
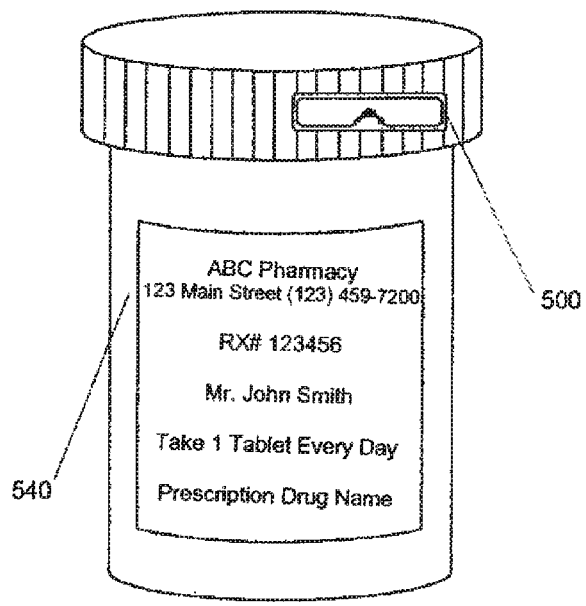
FIGS. 31a and 31b show RFID seals affixed to product containers.
Figure 31B:
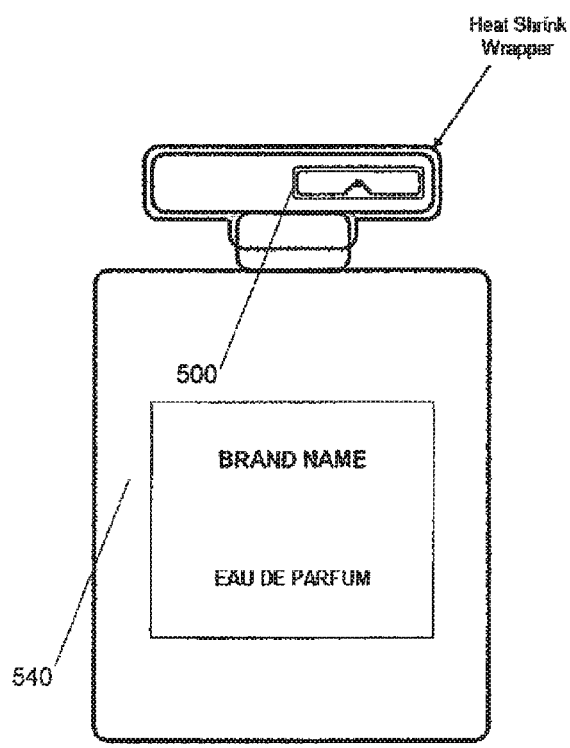

As shown in FIGS. 31a and 31b, RFID seals 500 may also be affixed to products 540 for brand and product protection. In this application, RFID seals 500 are affixed to products 540 to ensure consumers are purchasing genuine goods and goods that have not been tampered with. If the product has been tampered with, the RFID seal will become detuned and will not transmit a signature when scanned by an RFID reader. Furthermore, if the product is a counterfeit, the counterfeit product will not carry an RFID seal so no signature will be transmitted when scanned by the RFID reader.

Figure 32:
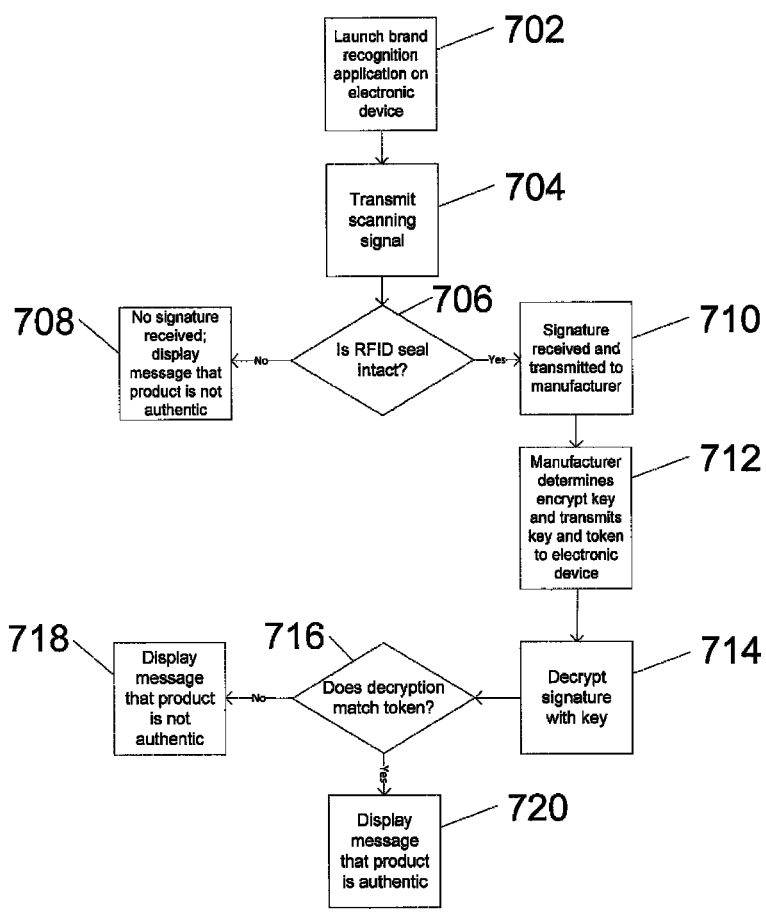
FIG. 32 is a flowchart shows the steps of an RFID seal reading method.

FIG. 32 shows the steps of an RFID seal reading methodology. The method 700 of authenticating a product begins when a user launches a brand recognition application on an electronic device that has an RFID reader (step 702). The user then scans a product with the electronic device such that the RFID reader transmits a scanning signal at a predetermined frequency (step 704). In response, the RFID seal on the product transmits a signature if the RFID seal is intact (step 706). If no signature is received by the RFID reader then the application outputs a message signifying that the product is not authentic or has been tampered with (step 708). If the RFID reader receives a signature, the signature is sent to the manufacturer to obtain an encryption key (step 710). Upon receiving the signature, the manufacturer determines the encryption key and sends the key and a token back to the electronic device (step 712). The electronic device then attempts to decrypt a portion of the signature using the decryption key (step 714). The electronic device determines if the token transmitted by the manufacturer matches the decrypted portion of the signature (step 716). If the token and the decrypted portion of the signature do not match, the device displays a message that the product is not authentic (step 718). If the token and the decrypted portion match, the device displays a message that the product is authentic (step 720).

Figure 33:
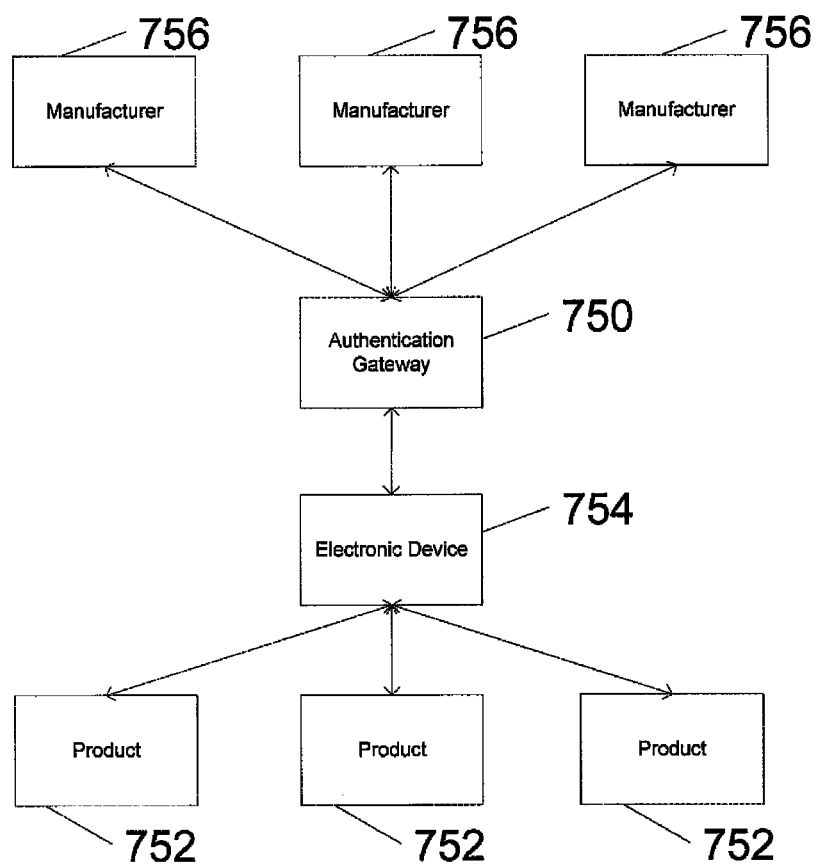
FIG. 33 is a block diagram of an RFID seal reading system.

As shown in FIG. 33, an authentication gateway 750 to which the signature is first transmitted from the electronic device 754 after scanning the product 752 may be employed. In this case, the signature from the electronic device includes manufacturer data, product data as well as the encrypted data. The authentication gateway 750 determines the manufacturer (via a look-up table) from the manufacturer data then transmits the product data to the manufacturer 756. The manufacturer 756 retrieves the encryption key and the token based on the product data (via a look-up table) and transmits these two to the authentication gateway 750. The authentication gateway 750 then transmits the encryption key and token to the electronic device 754 as described above.

Figure 34:
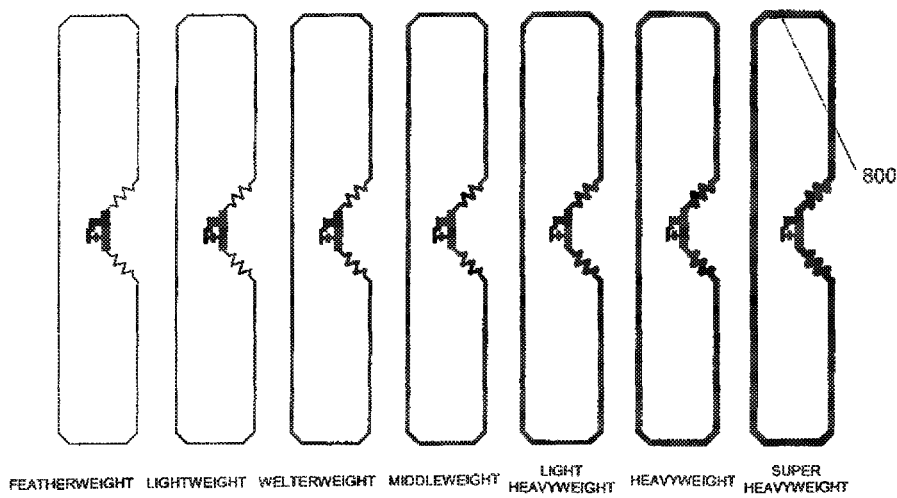
FIG. 34 is plan view of a plurality of RFID seals for use in a ribbon.
Figure 35:
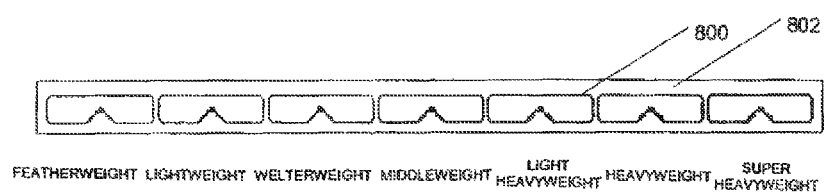
FIG. 35 is a plan view a ribbon comprising the RFID seals of FIG. 34.

In the embodiments above, the RFID seals are described and shown to be discrete. RFID seals may however be bundled to provide an indication as to the extent of loading or deformation of the support on which the RFID seals are mounted. For example, as shown in FIGS. 34 and 35, the RFID seals 800 may be affixed to a substrate in the form of a ribbon 802 with the various RFID seals 800 being designed to become detuned at different tensile loads. The super heavyweight RFID seal 800 requires a greater tensile load to be placed thereon before the break-away antenna portion thereof separates from the main antenna portion than the heavyweight RFID seal 800 and this follows in descending order for the other RFID seals 800 (light heavyweight, middleweight, welterweight, lightweight and featherweight). The ribbon 802 in this embodiment is a continuous strip of material formed for example of PVDF or other suitable material. If the ribbon 802 is formed of rigid ceramic or mica then individual tablets are used for each RFID seal 800 that have different tensile load detuning points. The individual tablets are aligned side by side and are of appropriate thicknesses so that the RFID seals detune at the proper tensile loading point.

As the tensile load applied to the ribbon increases from zero, the ribbon 802 undergoes elongation of about 0.01% to 14.00%. As this happens, the various RFID seals will become detuned in graduated order with the featherweight RFID seal becoming detuned first followed by the lightweight RFID seal, then the welterweight RFID seal, then the middleweight RFID seal, then the light heavyweight RFID seal, then the heavyweight RFID seal and finally the super heavyweight RFID seal.

The RFID seals become detuned at various tensile loads due in part to the substrate type and antenna coating of each RFID seal 800. The substrate may range in density from about 0.97 to 1.27 g/mol. The antenna is vacuum formed on the substrate. As previously described, the substrate used may be PVDF flouropolymer or individual tablets of ceramic or mica that rupture depending on thickness. Other substrates are possible and may be determined in accordance with the design considerations known in the art e.g. type, thickness, density, elongation rupture, tensile strength, flexural strength, young's elastic modulus, coefficient thermal stability, dielectric constant and glass temperature.

In one embodiment, the antenna coating is formed of Parylene UV and Acrylic Tollcoat and the substrate is a tablet of ceramic or mica. In another embodiment, the substrate is an oxide, alumina or ceria or a non-oxide, carbide or silicide. In another embodiment, the substrate is formed of a polyamides, polyethylene, acrylonitrile, polyvinyl 'c', polysulfone, polyetherimide or elastomeric material. In another embodiment, attaching epoxies are used, e.g. silicones, aluminum filled induction cured epoxy, thermal sink compounds and magnetic bonding epoxies, to attach the RFID seals 800 to the surface depending on the application.

In other embodiments, the substrate is sheet-layer plastics of varying density or ceramics known in the art that is suitable for particular high temperature application and that achieve the different tensile load detune points. The antenna is manufactured from magnesium, cadmium copper, tin, aluminum, nickel, nickel/copper alloy, silver, gold, platinum, chromium, liquid gallium or liquid gallistan.

Figure 36:
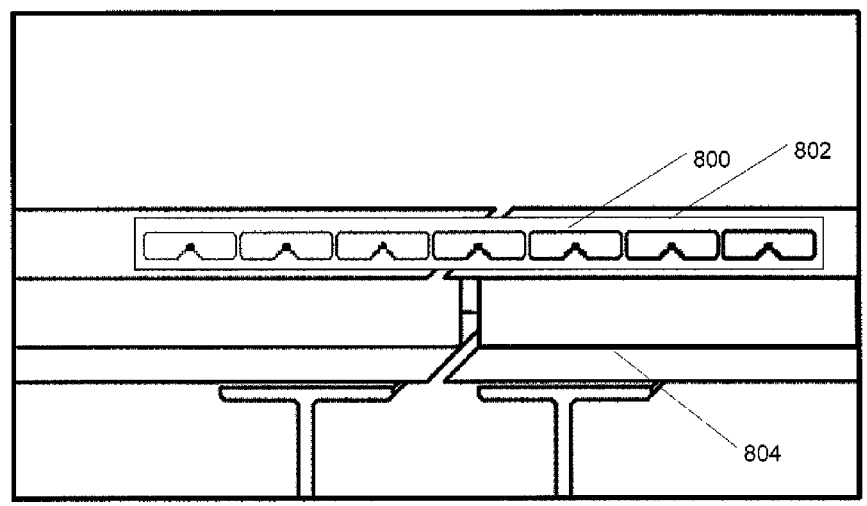
FIG. 36 shows the ribbon of FIG. 35 affixed to expansion control joints.

The ribbon 802 may be used to detect the tensile load placed on structures. As shown in FIG. 36, the ribbon 802 is affixed to expansion control joints 804. As the tensile load applied to separate or bring together the expansion controls joints 804 increases depending on the magnitude of the tensile load, one or more of the RFID seals 800 on the ribbon 802 will become detuned and will cease transmitting unique signatures when scanned at the predetermined frequencies. Thus, a reader can detect the movement of the expansion control joints 804 and the extent of the tensile load placed on the expansion control joints based on the number of RFID seals of the ribbon that respond to scanning signals. The ribbon 802 may be applied to bridges, arches, carrying beams and structural central loads in longitudinal or transverse orientation.

A handheld reader may be used to detect the increasing tensile loads applied to the ribbon 802. Maintenance crew may therefore survey the expansion control joints 804 by scanning the joints 804 with a reader that transmits scanning signals at the various predetermined frequencies for the RFID seals 800.

Figure 37A:
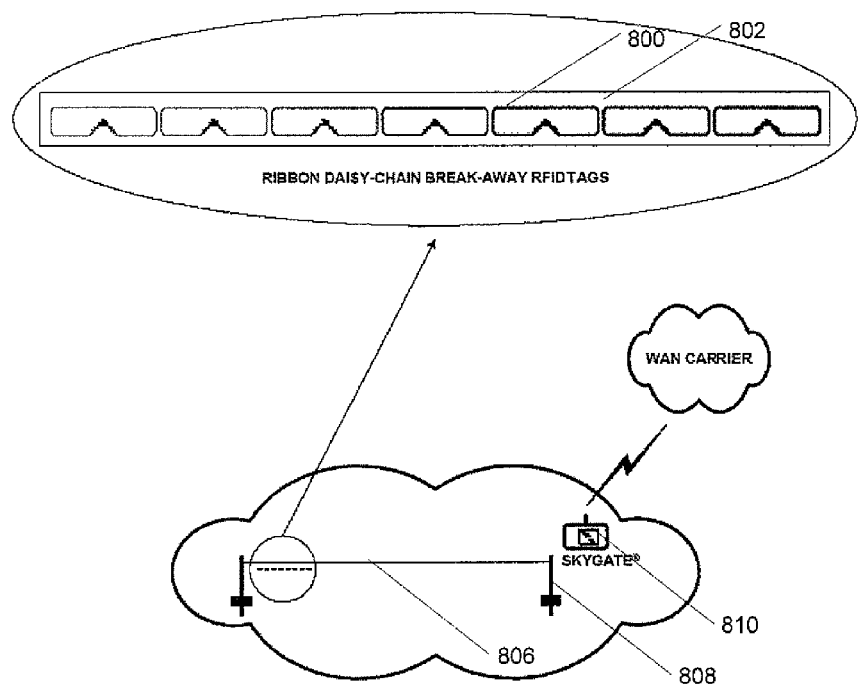
FIGS. 37a and 37b shows the ribbon of FIG. 35 affixed to a cord.
Figure 37B:
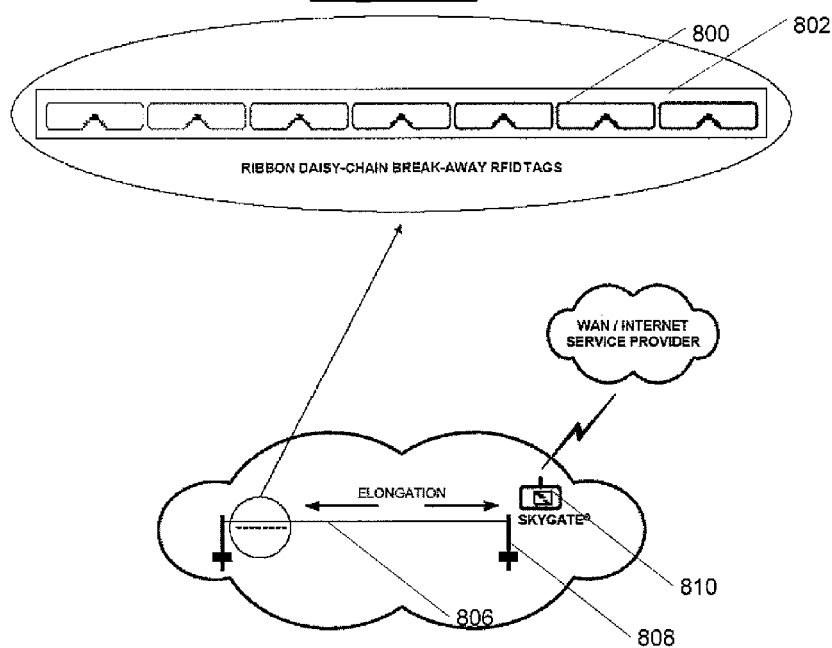

As shown in FIGS. 37a and 37b, the ribbon 802 may also be used to detect movement in other surfaces. For example, the ribbon 802 may be affixed to a cord 806 which is pulled taut between stakes 808. In the event of movement of the stakes, tension is applied to the cord 806 and the resulting elongation or compression, may result in one or more of the RFID seals 800 becoming detuned depending on the magnitude of the applied tension.

Figure 38:
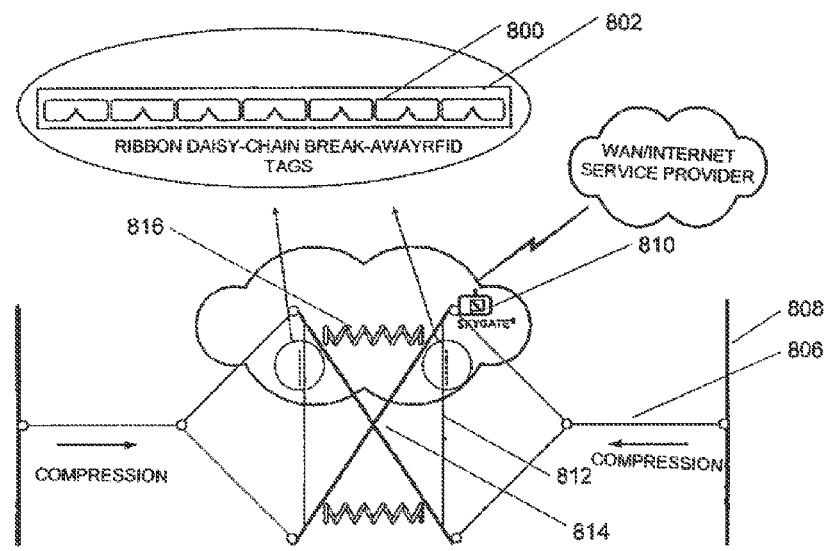
FIG. 38 shows ribbons of the type shown in FIG. 35 affixed to a scissor mechanism.

The ribbon 802 may also be placed on the cross-ties 812 of a scissor mechanism 814 as shown in FIG. 38. The cord 306 is a rigid member affixed to the scissor mechanism 814. The scissor mechanism 814 has springs 816 holding the mechanism 814 in a particular orientation. The cross-ties 812 extend perpendicular to the springs 816. When the cord 806 is compressed, the springs 816 compress which elongates the cross-ties 812 and detunes at least some of the RFID seals 800 on the ribbon 802.

In FIGS. 37a and 37b, the scanning signals are transmitted by a polling station 810 at the various predetermined frequencies. The results of the scanning, detection of the signature or not, are then transmitted to a central processing site via the internet or other wired or wireless communication network. Handheld scanning may also be performed in the manner already described.

Figure 39:
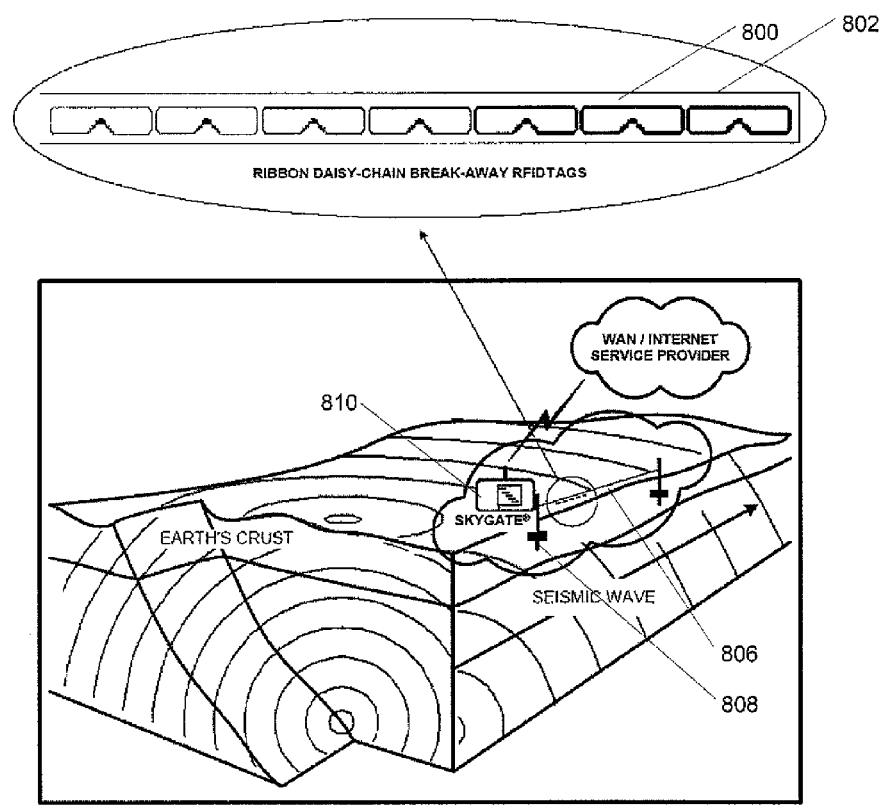
FIG. 39 show the cord of FIGS. 37a and 37b used to detect movement on the earth's surface.
Figure 40:
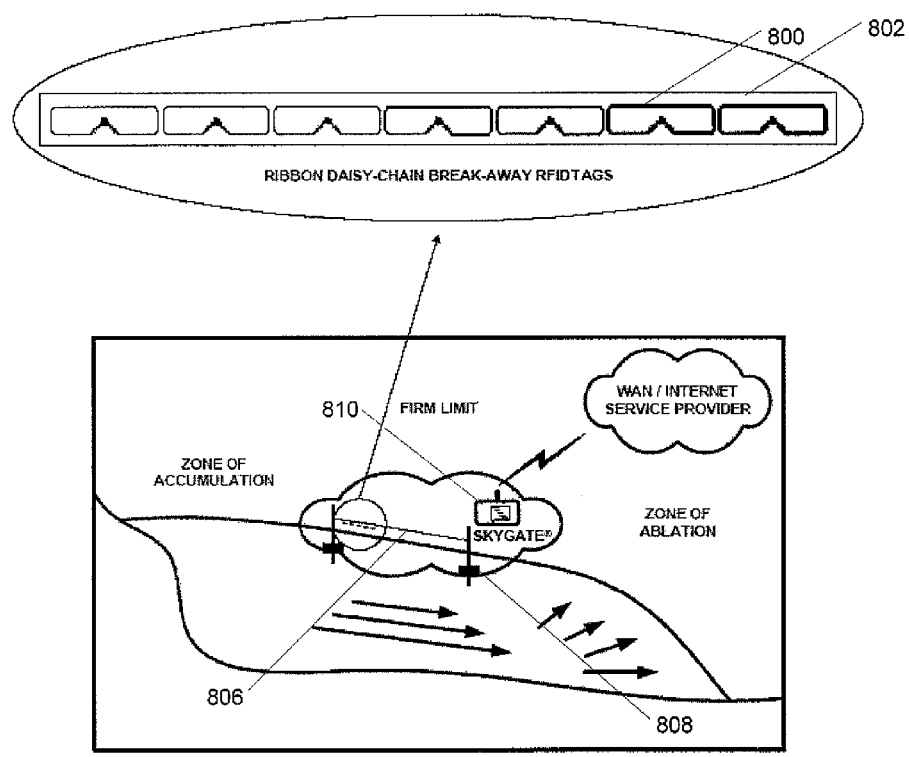
FIG. 40 shows the cord of FIGS. 37a and 37b used to detect an avalanche.
Figure 41:
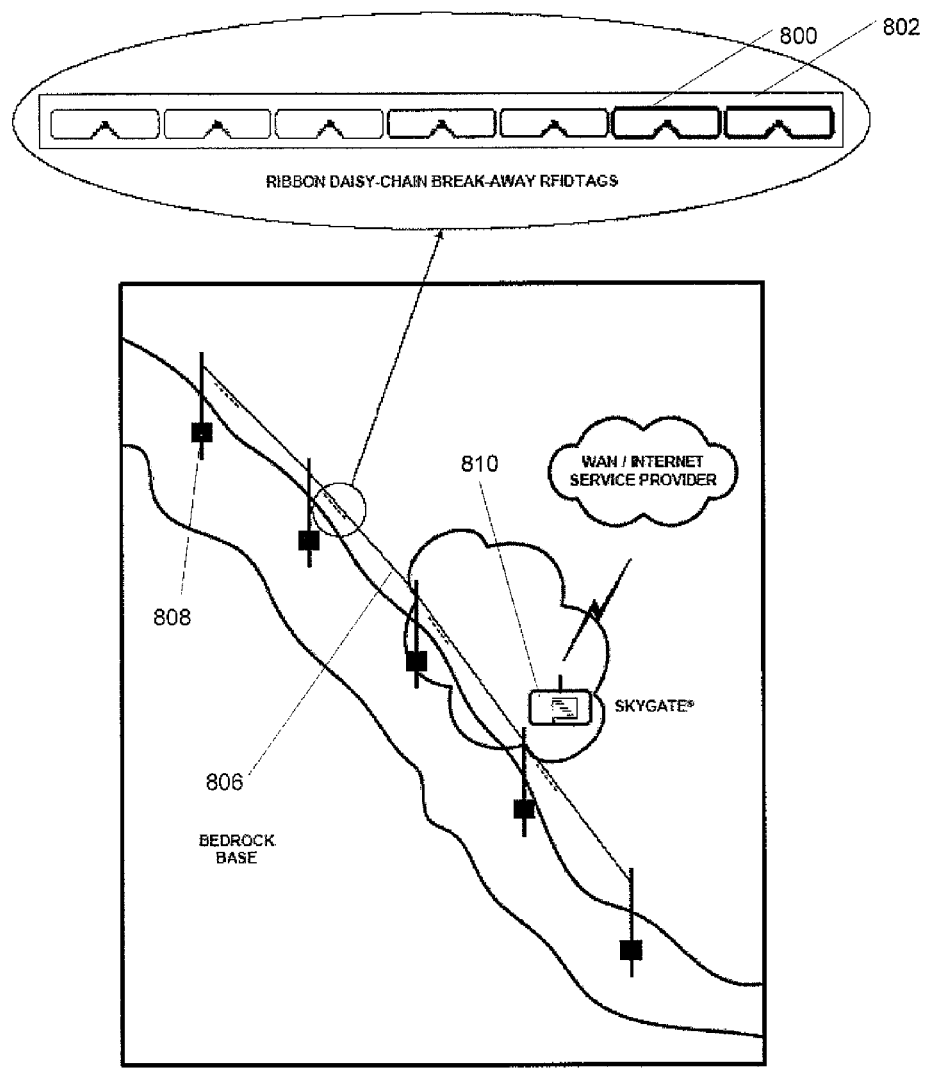
FIG. 41 shows the cord of FIGS. 37a and 37b used to detect a landslide.

FIG. 39 shows the cord and stakes employed to detect seismic movement in the earth's crust associated with earthquakes. FIG. 40 shows the cord and stakes employed to detect avalanches while FIG. 41 shows the cord and stakes employed to detect landslides.

Figure 42:
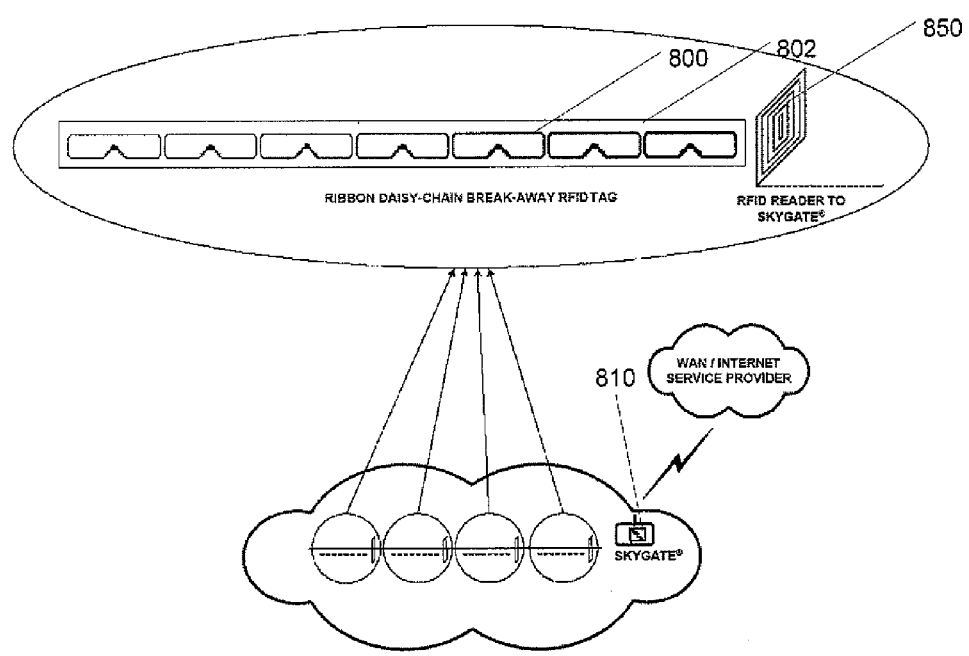
FIG. 42 is enlarged view of another embodiment of the ribbon of FIG. 35 used to detect over-expansion of a pressurized vessel.

In another embodiment, the ribbon 802 may be used to measure heat expansion and contraction in structures in high electromagnetic interference (EMI) environments (e.g. industrial/scientific facilities and nuclear power stations) or other environments as shown in FIG. 42. The RFID seals 800 on the ribbon are separated by individual readers 850 which scan the individual RFID seals 800 to detect the signature of RFID seals 800. If extensive expansion or contraction of a structure to which the ribbon is affixed occurs, one or more of the RFID seals 800 of the ribbon will become detuned depending on the amount of expansion or contraction. The readers 850 transmit signatures output by the RFID seals external to the high EMI environment via a protected cable to a polling station 810. The signatures can then be processed at the polling station 810 or transmitted to another location for further processing.

In another embodiment, the readers 850 are shielded to protect them in the EMI environment with shielded coaxial cable and the signatory from the readers 850 are transmitted to the polling station 810 via a shielded coaxial cable.

Although embodiments have been described, those of skill in the art will appreciate that variations and modifications may be made without departing from the scope thereof as defined by the appended claims.

What is claimed is:

1. A container comprising:
   a container body; and
   a passive seal on at least a portion of said container body, said seal including an antenna and a tag tuned to said antenna, said tag becoming detuned when said antenna is compromised during opening of said container,
   wherein said antenna includes a main antenna portion and at least one break-away portion coupled to said main antenna portion, said at least one break-away portion separating from said main antenna portion when said container is opened resulting in said tag becoming detuned from said antenna.

2. A container according to claim 1 wherein said tag outputs a signature in response to a scanning signal when tuned to said antenna.

3. A container according to claim 2 wherein said tag resonates in response to said scanning signal when tuned to said antenna and outputs a code unique to said tag.

4. A container according to claim 3 wherein said scanning signal is of a predetermined frequency.

5. A container according to claim 1 wherein said at least one break-away portion is coupled to said main antenna portion by one-time contacts.

6. A container according to claim 5 wherein said main antenna portion is provided on a door of said container and wherein said at least one break-away portion is provided on a doorjamb of said container.

7. A container according to claim 5 comprising a plurality of break-away portions at spaced locations along said antenna.

8. A container according to claim 7 wherein said main antenna portion is provided on a door of said container and wherein at least one of said break-away portions is provided on a doorjamb of said container.

9. A container according to claim 8 wherein another of said break-away portions is provided adjacent a lock on said door.

10. A container according to claim 5 wherein said tag and antenna are disposed on a substrate secured to said container.

11. A container according to claim 10 wherein said substrate is adhered to said container.

12. A radio frequency identification seal according to claim 11 wherein said at least one break-away portion is coupled to said main antenna portion by one-time contacts.

13. A radio frequency identification seal according to claim 12 comprising a plurality of break-away portions.

14. A passive radio frequency identification seal comprising:
   an antenna including a main antenna portion and at least one break-away portion coupled to said main antenna portion; and
   a radio frequency identification (RFID) tag coupled and tuned to said antenna, said RFID tag outputting a signature in response to a scanning signal when tuned to said antenna,
   wherein said antenna is affixable to a container such that said at least one break-away portion separates from said main antenna portion when said container is opened resulting in said RFID tag becoming detuned from said antenna.

15. A radio frequency identification seal according to claim 14 wherein said RFID tag outputs a unique code in response to said scanning signal.

16. A system for monitoring at least one radio frequency identification (RFID) seal affixed to a vehicle, the system comprising:
   at least one passive RFID seal comprising:
      an antenna including a main antenna portion and at least one break-away portion coupled to said main antenna portion; and
      an RFID tag coupled and tuned to the antenna, said RFID tag outputting a signature in response to a scanning signal when tuned to said antenna; and
   at least one RFID reader mounted on structure by which the vehicle passes, the at least one RFID reader outputting the scanning signal and receiving the signature,
   wherein said at least one break-away portion separates from said main antenna portion when said antenna is compromised resulting in said RFID tag becoming detuned from said antenna.

17. The system of claim 16, further comprising a wireless transmitter mounted on the structure for transmitting the signature to a central location for verification.

18. The system of claim 16, wherein the structure is one of a highway entrance gate, a roadway lighting pole, an entrance gate to a yard and an exit gate from a yard.

19. The system of claim 16, wherein the vehicle is one of a truck, aircraft, automobile and shipping vessel.

20. The system of claim 16 wherein said RFID tag resonates in response to said scanning signal when tuned to said antenna and outputs a code unique to said RFID tag.

21. The system of claim 20 wherein said scanning signal is of a predetermined frequency.

22. The system of claim 20 wherein said at least one break-away portion is coupled to said main antenna portion by one-time contacts.

23. A structural material comprising:
at least one passive radio frequency identification (RFID) seal affixed to the structural material at a location prone to fatigue such that said at least one passive RFID seal spans portions of said structural material that move relative to one another upon fatigue, the at least one passive RFID seal comprising:
an antenna including a main antenna portion and at least one break-away portion coupled to said main antenna portion; and
an RFID tag coupled and tuned to the antenna, said RFID tag outputting a signature in response to a scanning signal when tuned to said antenna,
wherein when the structural material undergoes fatigue adjacent said location and said structural material portions move relative to one another, the at least one break-away portion separates from the main antenna portion to detune the at least one passive RFID seal.

24. The structural material of claim 23, wherein the structural material forms part of one of a wing of an airplane, a fuselage of an airplane, a tail of an airplane, landing gear of an airplane, a longeron of an airplane, a spar of an airplane, a rib of an airplane, an undercarriage of an airplane, a boom of a crane, a main trunnion support of a crane, a counterweight of a crane, a welding point of a crane, a lifting harness of a crane, a main span of a bridge, a pad bearing of a bridge, a parapet of a bridge, an expansion joint of a bridge, road decking of a bridge, a submersible support of a drilling rig, a bridge footing, a bridge/pier fastening, strapping, an anchor, a boiler, a nuclear fuel rod casement, a railway dolly assembly, a blade of a wind turbine, a spindle of a wind turbine, a stanchion of a wind turbine and a vessel.

25. The structural material of claim 23, wherein fatigue is selected from the group consisting of: cracks, protrusions, chevron buckling, hair-line fractures, corrosion notching, skin notching, skin stiffness and strain creep.

26. The structural material of claim 24, wherein fatigue is selected from the group consisting of: cracks, protrusions, chevron buckling, hair-line fractures, corrosion notching, skin notching, skin stiffness and strain creep.

27. The structural material of claim 23 wherein said RFID tag resonates in response to said scanning signal when tuned to said antenna and outputs a code unique to said RFID tag.

28. The structural material of claim 27 wherein said scanning signal is of a predetermined frequency.

29. The structural material of claim 27 wherein said at least one break-away portion is coupled to said main antenna portion by one-time contacts.

\* \* \* \* \*